US010267888B2

(12) United States Patent
Reis et al.

(10) Patent No.: US 10,267,888 B2
(45) Date of Patent: Apr. 23, 2019

(54) POINTING AN ANTENNA AT A SIGNAL SOURCE USING AUGMENTED REALITY

(71) Applicant: Higher Ground LLC, Palo Alto, CA (US)

(72) Inventors: Robert S. Reis, Palo Alto, CA (US); Shmuel Shaffer, Palo Alto, CA (US); Bruce L. McKinley, South Riding, VA (US)

(73) Assignee: Higher Ground LLC, Palo Alto, CA (US)

( * ) Notice: Subject to any disclaimer, the term of this patent is extended or adjusted under 35 U.S.C. 154(b) by 68 days.

(21) Appl. No.: 15/581,419

(22) Filed: Apr. 28, 2017

(65) Prior Publication Data

US 2018/0316885 A1 Nov. 1, 2018

(51) Int. Cl.
| | |
|---|---|
| *G01S 3/20* | (2006.01) |
| *H01Q 1/12* | (2006.01) |
| *H01Q 3/08* | (2006.01) |
| *H04B 7/195* | (2006.01) |
| *H04N 5/232* | (2006.01) |

(52) U.S. Cl.
CPC ............. *G01S 3/20* (2013.01); *H01Q 1/1257* (2013.01); *H01Q 3/08* (2013.01); *H04B 7/195* (2013.01); *H04N 5/23293* (2013.01)

(58) Field of Classification Search
CPC .......................... H04N 5/44504; H01Q 1/1257
See application file for complete search history.

(56) References Cited

U.S. PATENT DOCUMENTS

| | | | |
|---|---|---|---|
| 6,285,338 B1 | 9/2001 | Bai et al. | |
| 6,937,188 B1 | 8/2005 | Saunders et al. | |
| 9,548,790 B1 | 1/2017 | McKinley | |
| 2008/0284669 A1* | 11/2008 | Hunton | H01Q 1/22 343/757 |
| 2009/0033576 A1* | 2/2009 | Smoyer | H01Q 1/125 343/761 |

(Continued)

OTHER PUBLICATIONS

Analytical Graphics, Inc., Satellite AR (Version 2.4), Sep. 22, 2011, [Mobile Application Software], Retrieved from https://play.google.com/store/apps/details?id=com.agi.android.augmentedreality&hl=en.

(Continued)

*Primary Examiner* — Nicholas G Giles
(74) *Attorney, Agent, or Firm* — The Mueller Law Office, P.C.

(57) ABSTRACT

An anticipated direction to a signal source is determined by a communication device having an antenna. The communication device receives video images in a field of view of a camera and determines, using sensors of the communication device, an antenna direction. The antenna direction is the direction that the antenna of the communication device is pointing. The communication device displays, using a display screen, the video images, an antenna direction indicator, and a guiding icon. The antenna direction indicator indicates the antenna direction relative to the field of view of the camera, and the guiding icon represents a direction offset from the anticipated direction. An energy value of a signal received from the signals source is determined by the communication device using the antenna, and a position of the guiding icon on the display screen is updated based on the anticipated direction.

18 Claims, 19 Drawing Sheets

(56) References Cited

U.S. PATENT DOCUMENTS

| | | | |
|---|---|---|---|
| 2010/0194641 A1* | 8/2010 | Miller | G01S 5/04 |
| | | | 342/417 |
| 2013/0135146 A1* | 5/2013 | Ransom | G01S 19/23 |
| | | | 342/357.36 |
| 2013/0271319 A1* | 10/2013 | Trerise | H01Q 1/125 |
| | | | 342/359 |
| 2014/0113681 A1 | 4/2014 | Reis et al. | |
| 2015/0263408 A1* | 9/2015 | Hirabe | H01Q 1/1228 |
| | | | 343/894 |
| 2016/0308601 A1* | 10/2016 | Mochida | H01Q 1/1257 |
| 2016/0374047 A1 | 12/2016 | Reis | |
| 2017/0005697 A1 | 1/2017 | McDermott | |
| 2017/0006620 A1 | 1/2017 | Reis | |
| 2017/0045623 A1* | 2/2017 | Zlogar | G01S 3/14 |
| 2017/0179566 A1* | 6/2017 | Hirabe | H01Q 1/1257 |

OTHER PUBLICATIONS

Dishpointer, Augmented Reality App—the Next Generation Satellite Finder, Aug. 2009, Accessed May 22, 2017, http://www.dishpointer.com/2009/augmented-reality-satellite-finder/.

Gawronski and Craparo, Antenna Scanning Techniques for Estimation of Spacecraft Position, Proceedings, IEEE Aerospace Conference, 2002, pp. 2-939-2-948 vol. 2., Dec. 6, 2002.

Karol and Ristroph, Improving Conical Scanning for Satellite Tracking On-The-Move, Pasadena, CA, 2012, 7 pages, last modified Nov. 22, 2013, http://authors.library.caltech.edu/42630/1/Karol_2012.pdf.

Marsh, Inertially Stabilized Platforms for SATCOM On-The-Move Applications: A Hybrid Open/Closed-Loop Antenna Pointing Strategy, Massachusetts Institute of Technology, Department of Aeronautics and Astronautics, Jun. 6, 2008, 217 pages.

* cited by examiner

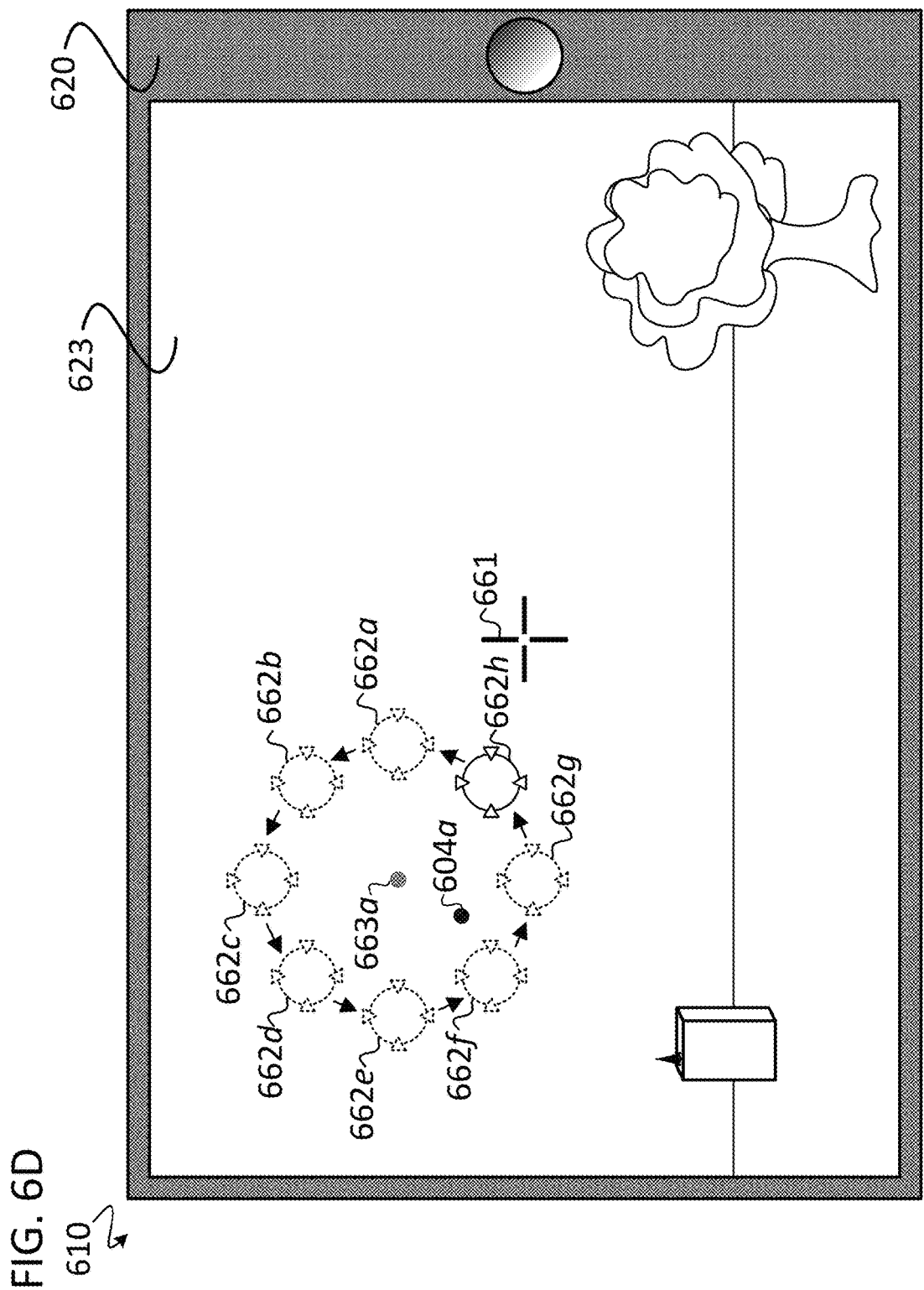

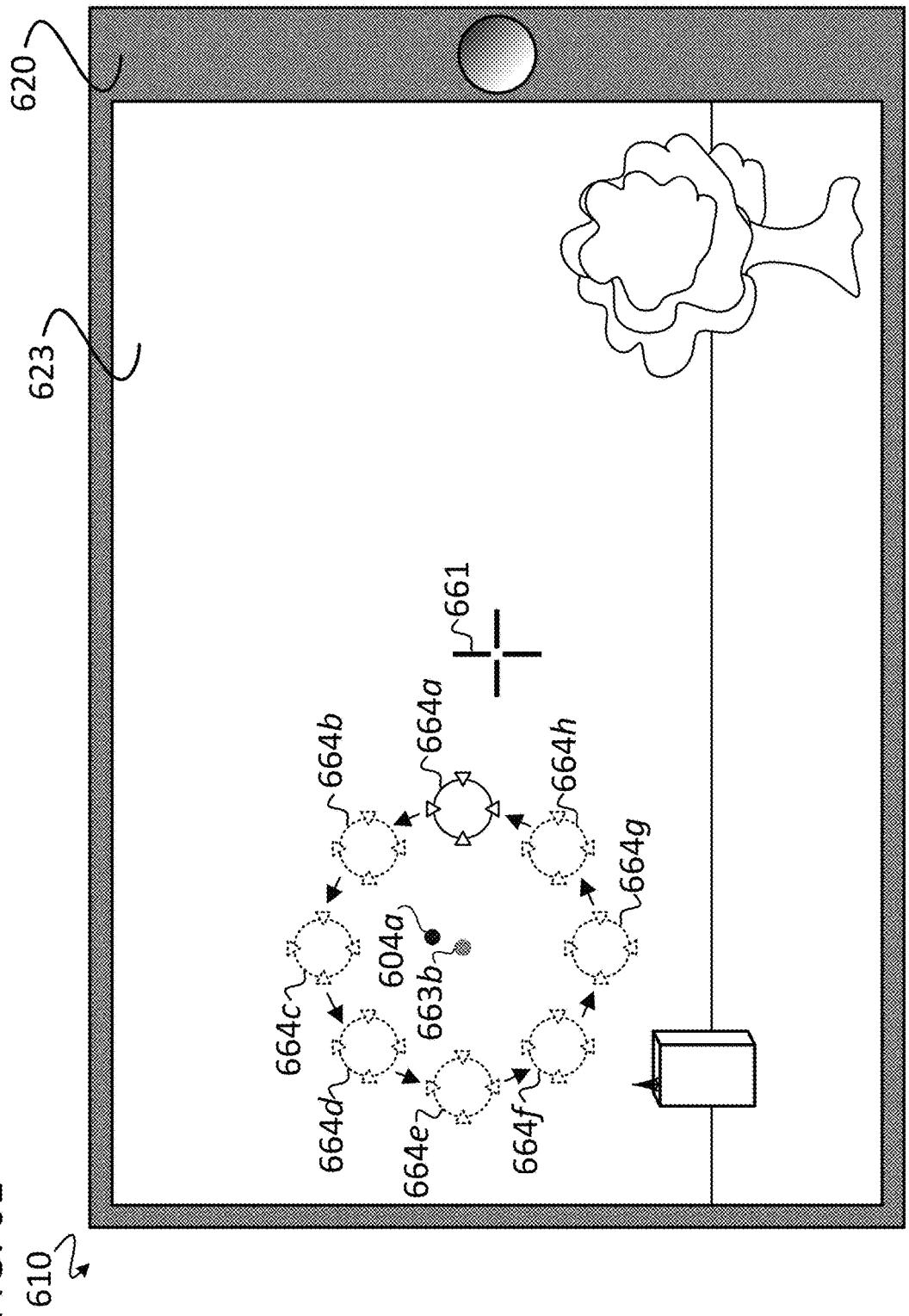

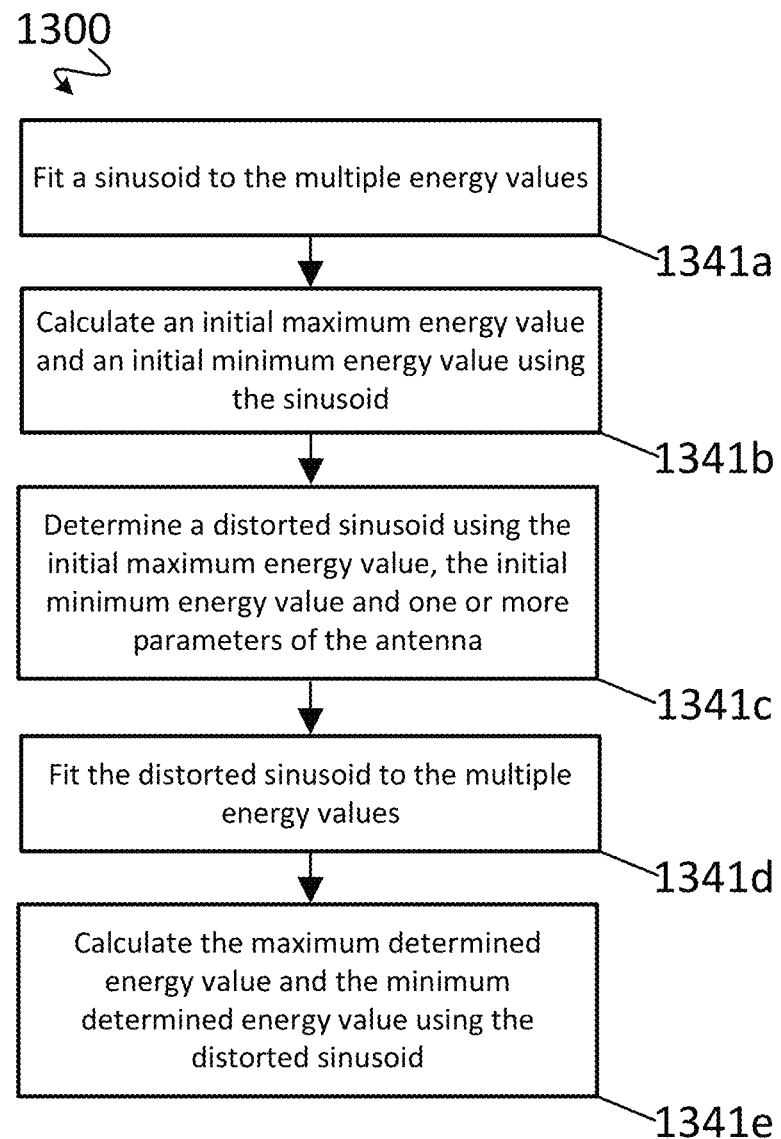

POINTING AN ANTENNA AT A SIGNAL SOURCE USING AUGMENTED REALITY

BACKGROUND

Though terrestrial communication networks now reach much of the earth, there are still many regions in which an individual is not able to exchange communication information with another individual. This communication information could include voice, text or video data that the individual ("user") desires to exchange with the other individual using a device such as a cell phone ("user device"). The user could be prevented from exchanging communication information because the user is in an environment where there are no terrestrial communication networks to provide cell service or internet access, or perhaps is in a region that does not have a terrestrial communication network that the user is authorized to use.

To receive convenient and predictable communication connectivity, the user may use a communication device that is capable of exchanging communication signals between the communication device and satellites of a satellite constellation. Examples of satellite constellations include the Global Positioning System (GPS), Galileo and GLONASS constellations for navigation and geodesy, the Iridium and Globalstar satellites for telephony services, the Disaster Monitoring Constellation and RapidEye for remote sensing, the Orbcomm satellites for messaging service, the Russian elliptic orbit Molniya and Tundra constellations and the Cospas-Sarsat search and rescue satellites.

Such satellites include Low Earth Orbiting satellites (LEDs), Geostationary Satellites (GEOs), or other satellites. LEO satellites travel at high angular velocity to maintain orbit. As a result, the coverage area provided by a LEO satellite moves as the LEO satellite travels. Thus, many LEO satellites are often needed to maintain continuous coverage over an area.

Because the coverage area provided by a LEO satellite moves, when a user wishes to initiate communications, it may be minutes or hours before a LEO satellite is above the horizon and can begin the exchange of communication signals. GEO satellites, by contrast, move at the same angular velocity as the rotation of the earth's surface and can provide permanent coverage over a large area. Thus, to maintain constant and predictable communication, GEO satellites are sometimes preferred over LEO satellites for communication.

To communicate with GEO satellites with acceptable signal strength, and to avoid interfering with other satellites or terrestrial transceivers that operate in the same frequency band as the communication device, the communication device may be designed to have a narrow antenna lobe and must point precisely towards its intended satellite before transmitting and/or receiving a communication signal. However, because such communication devices may be optimized for size, weight and portability, traditional antenna pointing systems for high accuracy antenna pointing may be undesirable or impractical.

SUMMARY

In some embodiments, one or more systems carry out a method that involves determining, by a communication device having an antenna, an anticipated direction to a signal source. The communication device receives, using a camera of the communication device, video images in a field of view of the camera and determines, using sensors of the communication device, an antenna direction. The antenna direction is the direction that the antenna of the communication device is pointing. The communication device then displays, using a display screen of the communication device, (1) the video images, (2) an antenna direction indicator, and (3) a guiding icon. The antenna direction indicator indicates the antenna direction relative to the field of view of the camera, and the guiding icon represents a direction offset from the anticipated direction. An energy value of a signal received from the signals source is determined by the communication device using the antenna, and a position of the guiding icon on the display screen is updated based on the anticipated direction.

In some embodiments, a communication device that uses augmented reality to point an antenna of the communication device in the direction of a communication satellite to exchange communication messages between the communication device and the communication satellite is disclosed. The communication device includes: an antenna that receives a signal from a signal source; a receiver module coupled to the antenna to receive and process the signal; a sensor module to determine motion and position information of the communication device; a display screen to display a plurality of icons; a memory that stores instructions; and a processor coupled to the receiver module, the sensor module, the display screen, and the memory. The processor is configured to execute the instructions that are stored in the memory. The instructions, when executed by the processor, cause the processor to execute a method that includes determining an anticipated direction to a signal source. Then, an antenna direction is determined using the sensor module. The antenna direction is the direction that the antenna is pointing. The display screen displays an antenna direction indicator and a guiding icon. The antenna direction indicator indicates the antenna direction, and the guiding icon represents a direction offset from the anticipated direction. Then, an energy value of the signal received from the signal source is determined using the receiver module. The communication device updates position of the guiding icon on the display screen based on the anticipated direction. The steps of determining the antenna direction through updating the position of the guiding icon are repeated to generate a plurality of energy values for a plurality of antenna directions around the anticipated direction. Then, an updated anticipated direction to the signal source is determined based on the plurality of energy values and the plurality of antenna directions. The steps of determining the antenna direction through the step of determining the updated anticipated direction are repeated using the updated anticipated direction to the signal source as the anticipated direction to the signal source.

In some embodiments, one or more systems carry out a method that involves determining, by a communication device having an antenna, an anticipated direction to a signal source. The communication device instructs a user of the communication device to move the communication device to point the antenna in an antenna direction offset from the anticipated direction to the signal source, wherein the antenna direction is the direction that the antenna is pointing. The instructing is updated to cause the antenna direction to be moved around the anticipated direction. A signal from the signal source is received by the antenna as the antenna direction is moved around the anticipated direction. Then, a plurality of energy values is generated by measuring, by the communication device, an energy value of the signal a plurality of times as the antenna direction is moved around the anticipated direction. A maximum energy value, a minimum energy value, a direction to the maximum energy value and a direction to the minimum energy value are calculated by the communication device based on the plurality of energy values. The anticipated direction to the signal source is then updated based on the maximum energy value, the minimum energy value, the direction to the maximum energy value and the direction to the minimum energy value. The step of determining the antenna direction through the step of determining an updated anticipated direction to the signal source are then repeated.

BRIEF DESCRIPTION OF THE DRAWINGS

FIG. 6A-6E are simplified representations of the communication device shown in FIG. 4, in accordance with some embodiments.

FIG. 13 is a simplified flowchart of an example process performed by the communication device shown in FIG. 4, in accordance with some embodiments.

DETAILED DESCRIPTION

Figure 1:
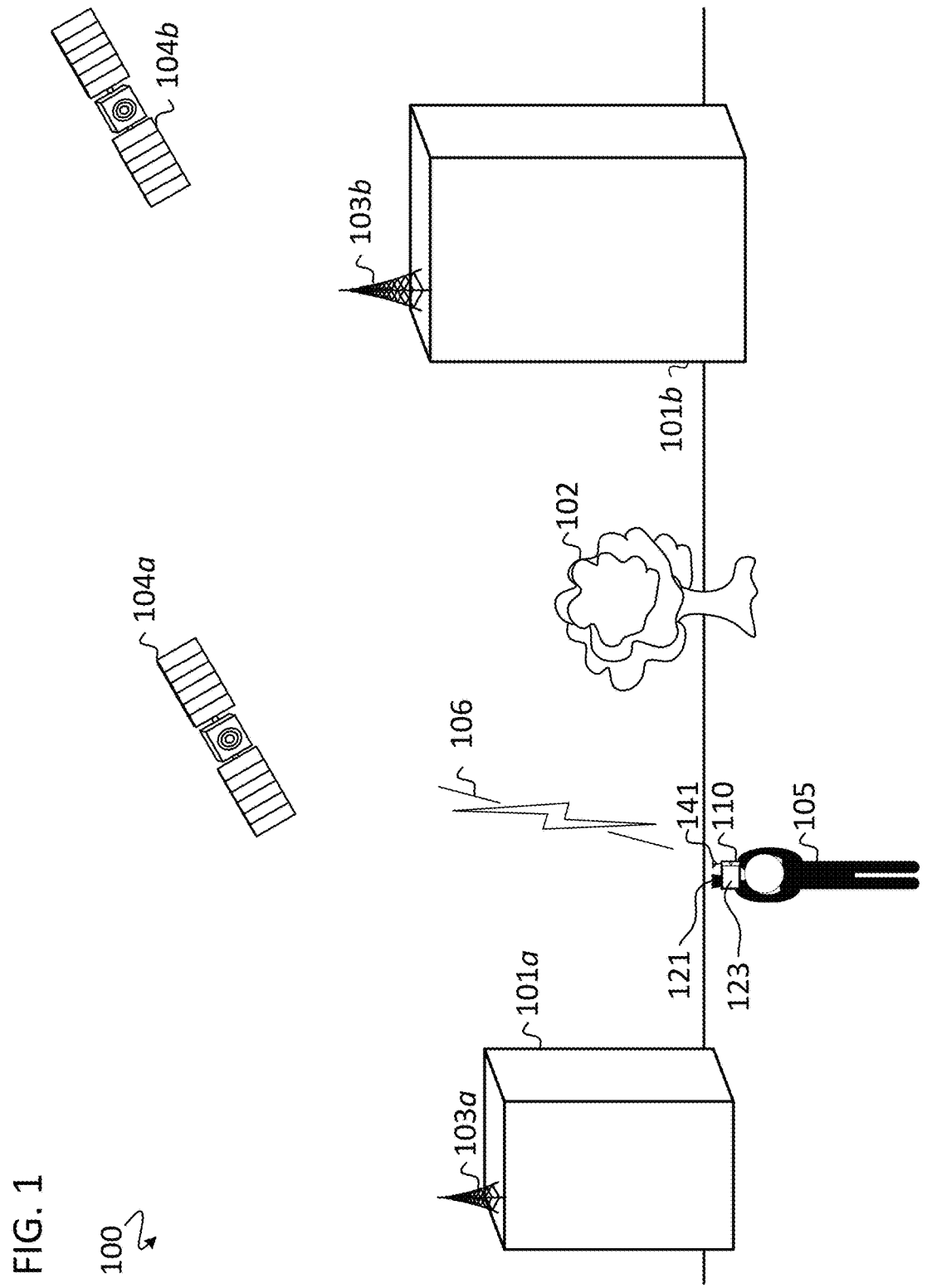
FIG. 1 is a simplified example environment for determining a direction to a signal source using augmented reality, in accordance with some embodiments.

In some embodiments, augmented reality enables an improved technique for pointing an antenna of a communication device in the direction of a communication satellite to exchange communication messages between the communication device and the communication satellite. As described below, a display of the communication device is overlaid with the augmented reality information to guide a user of the communication device to zero-in on the communication satellite's position in the sky. In this manner, complex, heavy, expensive equipment for automatically aligning the antenna of the communication device with the satellite is not needed. The systems and methods described below, therefore, enable an improved, inexpensive and highly portable solution for pointing the antenna at the communication satellite, among other improvements and advantages.

There are many regions in which an individual is not able to exchange (e.g. send and/or receive) communication information with another individual. As is disclosed in patent application Ser. No. 15/461,854, filed on Mar. 17, 2017 and entitled "Adaptive Augmented Reality Satellite Acquisition" all of which is incorporated herein by reference, in such regions the user can communicatively and physically couple a user device to a communication transceiver device ("communication transceiver"). Thereafter, communication information originating at the user device is received by the communication transceiver, the communication information is imprinted onto communication signals, and the communication signals are transmitted from the communication transceiver to a satellite communication network using an antenna of the communication transceiver. Similarly, communication signals (e.g. satellite transmission signals) carrying communication information are transmitted back from the satellite communication network and received by the antenna of the communication transceiver. The communication information is retrieved from the communication signals and provided from the communication transceiver to the user device. Thus, a user of the coupled user device and communication transceiver device ("communication device") can exchange communication information in regions that lack usable terrestrial communication networks. To provide predictable communication connectivity, in some embodiments, communication signals are exchanged with communication satellites that are in a geo-synchronous orbit (GEO satellites), low earth orbit (LEO satellites), or satellites in any other orbit.

However, as such communication devices proliferate, there is an increased likelihood that the user may be in, or near, a region that has terrestrial transceivers operating in the same frequency band as the communication transceiver (e.g. the microwave frequency band). For example, many terrestrial data/communication networks use line-of-sight data relays that operate in the microwave frequency band. If the user were to point the antenna of the communication transceiver (also operating in the microwave frequency band) substantially towards a terrestrial transceiver, the terrestrial transceiver could experience data loss, distortion, or other signal impairments. To prevent unintentional transmissions to such terrestrial transceivers, and to provide sufficient gain for communicating with GEO satellites (which have a high orbital altitude as compared to LEO satellites), in some embodiments, the antenna of the communication transceiver is designed to have a narrow main lobe.

The position of a GEO or LEO satellite and the position of the communication device may be relatively precisely known. However, due to inaccuracies in motion and orientation sensors of the user device, such as accelerometers, magnetometers and gyroscopes, the alignment or orientation of the user device is not precisely known. Thus, although the position of the communication satellite is known, there is ambiguity in the direction that the antenna of the communication device is pointing.

As will be discussed, precise antenna pointing is often accomplished using an antenna that is adjustably mounted on a fixed base (e.g. a pedestal). The pointing direction of the antenna relative to the fixed base is often adjusted using a manual process (e.g. by manually rotating the antenna on a gimbal) or by a motor driven process. However, such solutions lack portability and involve heavy, complex, expensive equipment. For example, if the user is an athlete or a hiker, the user may be very sensitive to any additional weight or bulk that the user needs to transport. Therefore, the user may need to point the antenna of the communication transceiver, which has a narrow main lobe, substantially in the direction of the communication device without the stability of a fixed pedestal and without the precision of motor controlled positioning.

Systems and methods for pointing an antenna of a communication device, held by a user, substantially in the direction of a communication satellite are disclosed herein. Such systems and methods advantageously do not require using an antenna that is adjustably mounted on a fixed base. In some embodiments, a camera of the communication device that is pointed substantially in the same direction as the direction of the main lobe of the antenna is used with motion/position sensors of the communication device, and with the antenna, to generate an adaptive augmented reality display on a display screen of the communication device. The augmented reality display is used to instruct/guide the user to point the communication device in multiple directions around an anticipated direction of the communication satellite (thereby pointing the antenna in the multiple directions). Transmission signals transmitted from the communication satellite are received by the antenna and are used to determine signal energy/signal power values associated with the multiple pointing directions. The terms "signal energy" and "signal power" are used interchangeably herein as the signal power can be inferred from the signal energy and vice versa. After sufficient signal energy values have been collected (e.g. enough to perform a curve fitting algorithm), the signal energy values are used to determine an updated anticipated direction of the communication satellite. The augmented reality display can then continue to instruct the user to point the communication device in multiple directions around the updated anticipated direction of the communication satellite. By continually and adaptively adjusting and or/refining the pointing direction of the antenna, communication signals are exchanged between the communication device and the communication satellite with sufficient signal strength, and unintentional transmissions to terrestrial receivers are avoided, without the use of a fixed-base mount or motor control. Other improvements or advantages will also be described below or become apparent from the following disclosure.

FIG. 1 is a simplified example environment 100 for pointing an antenna in the direction of a signal source using augmented reality, in accordance with some embodiments. The simplified environment 100 has buildings 101a-b, a tree 102, terrestrial transceivers (e.g. line-of-sight microwave transceivers) 103a-b, communication satellites ("satellites") 104a-b, a user 105, and communication signals 106. As shown, the user 105 is holding and facing a communication device 110 that includes a camera 121, a display screen 123, and an antenna 141. The camera 121 and the antenna 141 are shown to be mounted on an upper side of the communication device 110 for clarity only. In some embodiments, the camera 121 and the antenna 141 are both located on a side of the communication device 110 that is opposite the display screen 123.

In some embodiments, the communication device 110 includes a user device, such as a cell phone, communicatively and physically coupled to a communication transceiver (not shown). In some embodiments, the user device includes the camera 121 and the display screen 123, and the communication transceiver includes the antenna 141. The communication device 110 can also be referred to as a terminal, or a satellite terminal.

The user 105 exchanges communication information with another individual (not shown) using the communication signals 106 transmitted from and/or received by the satellite 104a and the communication device 110 using the antenna 141. In some embodiments, the terrestrial transceivers 103a-b may transmit and receive signals in the same frequency band as the communication signals 106. The communication satellites 104a-b may be GEO satellites, LEO satellites, or satellites of another orbital altitude (e.g. non-GEO satellites, non-LEO satellites, or other satellites as known to one of skill in the art).

In some embodiments, the antenna 141 is designed to have a narrow main lobe. The narrow main lobe provides a desirable level of signal gain for transmitting and receiving communication signals 106 exchanged between the communication device 110 and the communication satellite 104a. Further, the narrow main lobe minimizes the risk of the user 105 inadvertently transmitting the communication signals 106 towards the terrestrial transceivers 103a-b (or towards satellite transceivers that are not part of a communication network that the user is authorized to communicate with). Precise antenna pointing is often accomplished using an antenna that is adjustably mounted on a fixed base (e.g. a pedestal), such as prior art antennas shown in FIG. 2 and FIG. 3. However, methods and systems are disclosed herein to advantageously accomplish precise antenna pointing without the use of such encumbrances.

Figure 2:
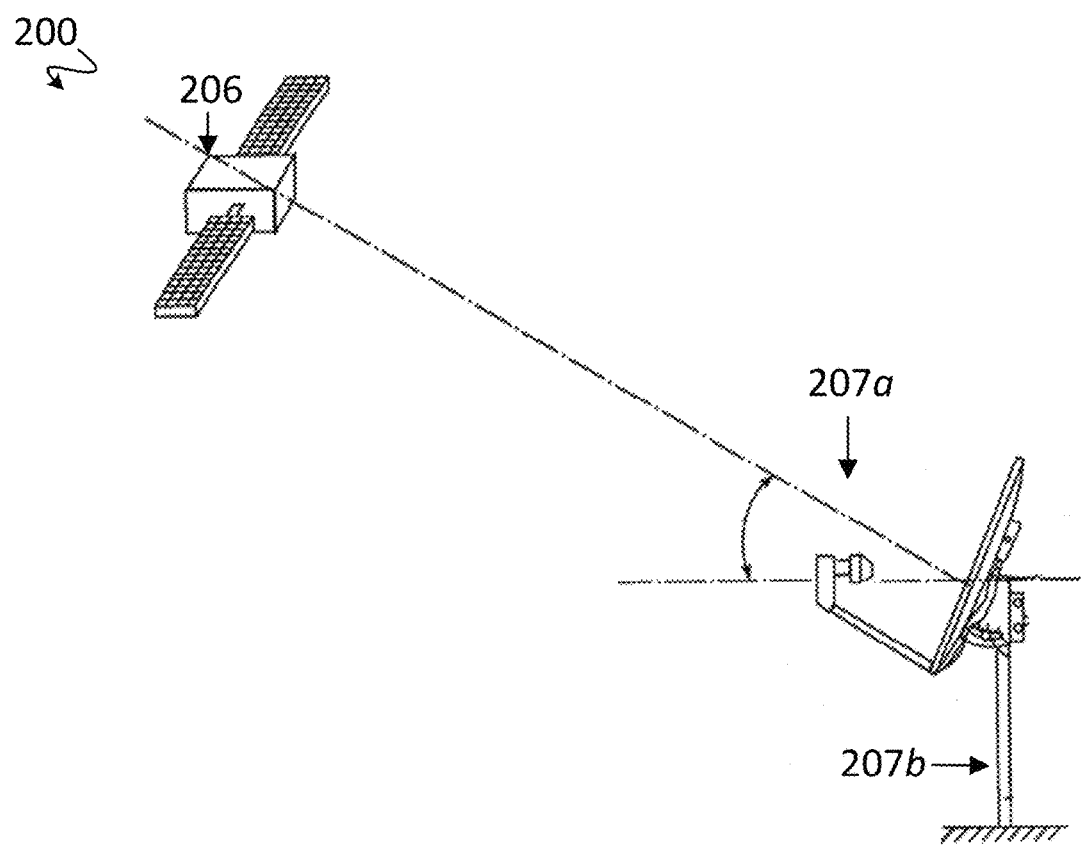
FIG. 2 is a prior art communication system.

FIG. 2 is a prior art communication system 200. The communication system 200 includes a satellite 206 and an antenna 207a. The antenna 207a is mounted on a fixed pedestal 207b. The antenna 207a can receive signals from the satellite 206 when the antenna 207a is pointed in the direction of the satellite 206 within an acceptable tolerance. The antenna 207a can be made to point in the direction of the satellite 206 by way of manual adjustments made to the antenna 207a. Typically, after the antenna 207a is made to point in the direction of the satellite 206, the pointing direction of the antenna 207a is locked in place with mechanical fasteners (e.g. wing-nuts). Such mechanical locking is in contrast with the hand-held communication device 110 of FIG. 1.

Figure 3:
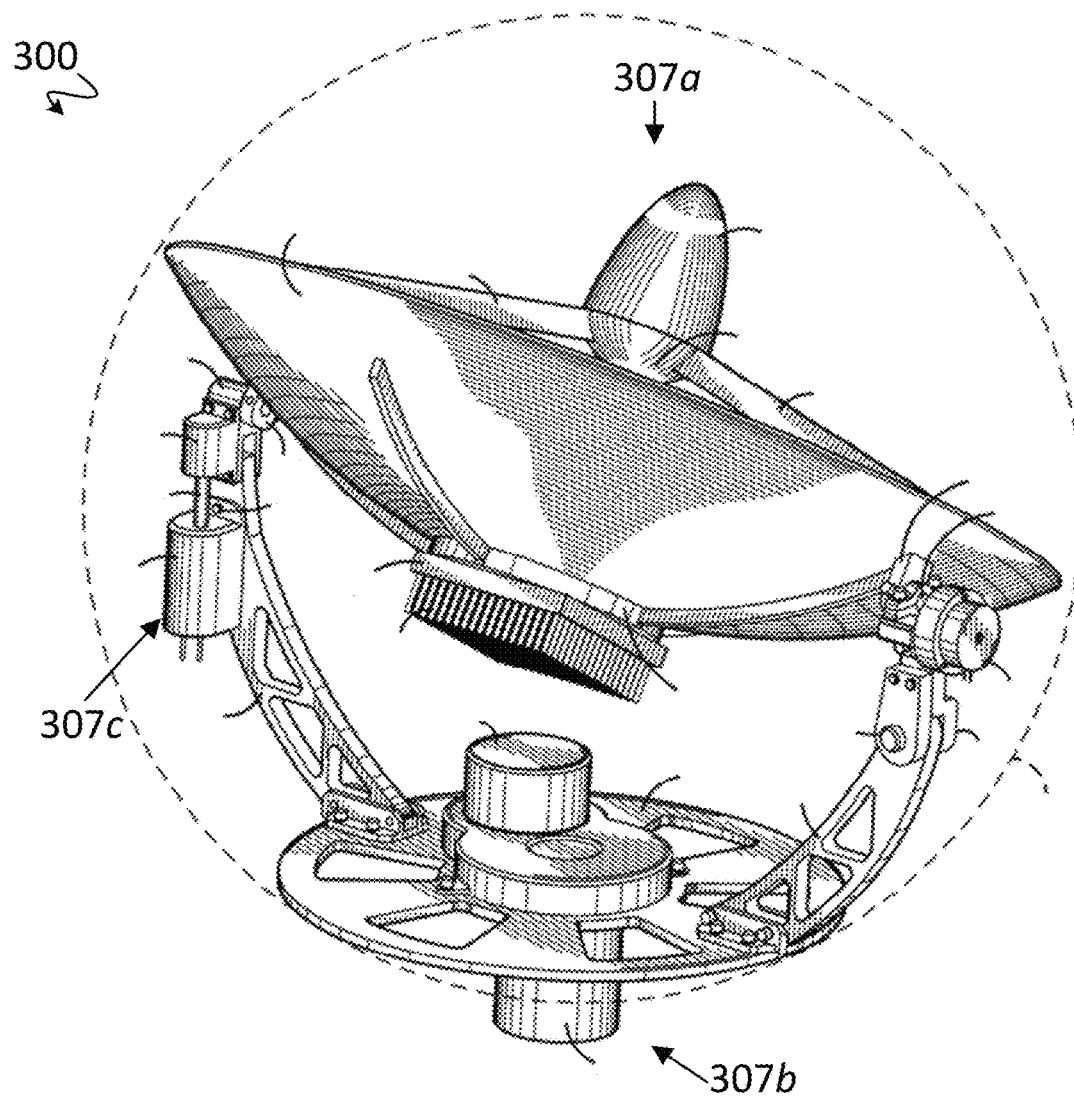
FIG. 3 is another prior art communication system.

FIG. 3 is another prior art communication system 300. The communication system 300 includes a satellite (not shown) and an antenna 307a that is coupled to a fixed mounting base 307b. The antenna 307a can receive signals from the satellite when the antenna 307a is pointed in the direction of the satellite. The fixed mounting base 307b includes a motor drive 307c that when enabled can precisely adjust the pointing direction of the antenna 307a. Typically, an antenna with motorized control can be made to point in a direction with high accuracy, precision and repeatability. Additionally, an antenna with motorized control can typically be made to track a moving satellite (e.g. a LEO satellite) without operator intervention.

Such motorized control is in contrast with the hand-held adjustments made by a user for positioning the communication device 110 of FIG. 1. A user 105 of FIG. 1 would find transporting a mounting pedestal and motor drives such as those shown in FIG. 2 and FIG. 3 to be impractical and unappealing. However, to effectively exchange communication signals with a communication satellite, and to avoid unintentional transmissions in the directions of terrestrial transceivers, the user 105 often still needs a way to point the communication device 110 in the direction of the satellite 104a.

Figure 4:
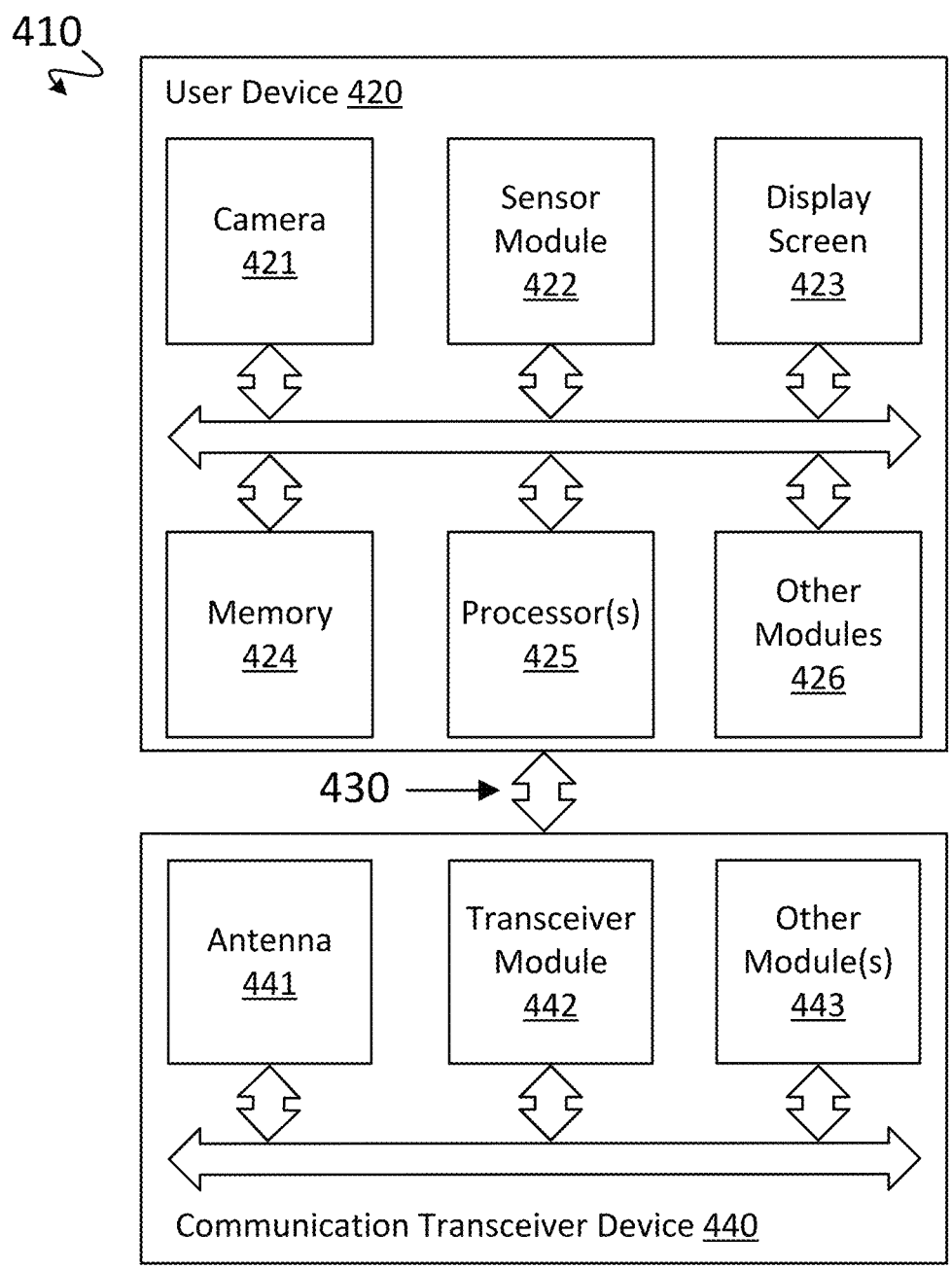
FIG. 4 is a simplified schematic diagram of a communication device, in accordance with some embodiments.

FIG. 4 shows a communication device 410 for pointing an antenna in the direction of a signal source using augmented reality. The communication device 410 is the same, or is similar to, the communication device 110 of FIG. 1. Some elements are omitted for ease of illustration and explanation. The illustrated elements are shown for illustrative and explanatory purposes only, so other embodiments may include more or fewer elements or different combinations of elements.

As shown, the communication device 410 includes a user device 420 and a communication transceiver device ("communication transceiver") 440. In some embodiments, the user device 420 is a cell phone, a tablet or a laptop. In some embodiments, the user device 420 is physically coupled to the communication transceiver 440. In some embodiments, the communication transceiver 440 is mounted onto a back side of the user device 420. In some embodiments, the user device 420 and the communication transceiver 440 are integrated into a single device (e.g. a satellite terminal). The user device 420 is communicatively coupled to the communication transceiver 440 through a link 430. In some embodiments, the link 430 is an RF link (e.g. a Wi-Fi or Bluetooth link). In other embodiments, the link 430 is a wired link (e.g. using a USB, I2C, SPI, RS-232 or another communication protocol). The link 430 can provide communication signals, control signals, or other signals between the user device 420 and the communication transceiver 440. In some embodiments, the link 430 can also provide power to or from the user device 420. In yet another embodiment, the communication transceiver 440 is integrated into the user device 420 and is an integral part of the user device 420.

The user device 420 includes a camera 421, a sensor module 422, a display screen 423, memory 424, processor(s) 425, and other module(s) 426. The camera 421 captures video images in the field of view (FOV) of the camera 421 and may provide the captured video images to the processor(s) 425, or may pass the captured video images directly to the display screen 423. The sensor module 422 generates sensor data using magnetometers, accelerometers, gyroscopes, GPS receivers, and/or other sensors and provides the sensor data to the processor(s) 425. The processor(s) 425 uses the sensor data to determine an estimated position of the communication device 410 as well as a pointing direction of the communication device 410 within a reference frame, such as with reference to true north and with further reference to a horizontal plane on which the user is located. For example, the pointing direction of the communication device 410 can include an azimuthal angle and a polar angle measured relative to the reference frame. The display screen 423 receives display instructions and/or display data from the processor(s) 425 to display the video images and a graphical overlay. The memory 424 can store data, such as coordinates of the communication device 410, pointing directions of the communication device 410, parameters indicative of locations of an intended receiver, parameters indicative of the locations of other unintended receivers, and signal energy/power values calculated by the communication device 410. Additionally, the memory 424 can store instructions that when carried out by the processor(s) 425 perform method steps. The memory 424 can store other parameters as well.

The other module(s) 426 can include Bluetooth communication modules, Wi-Fi communication modules, power storage and control modules, USB host and/or peripheral modules, and/or other modules. The processor(s) 425 include one or more processors and can include both a central processing unit (CPU) and a graphical processing unit (GPU), or other processors capable of processing signals, executing instructions and generating graphical interfaces.

The communication transceiver device 440 includes an antenna module ("antenna") 441, a transceiver module 442 and other module(s) 443. The antenna module 441 and the transceiver module 442 can transmit signals to, and receive signals from, a satellite such as the satellite 104a described with reference to FIG. 1. In some embodiments, the antenna module 441 includes a patch antenna. In some embodiments, the communication transceiver device 440 has a separate receiver module and a separate transmitter module, where each module is respectively coupled to the antenna 441. The other module(s) 443 can include Bluetooth communication modules, Wi-Fi communication modules, power storage and control modules, USB host and/or peripheral modules, and/or other modules. Satellite transmission signals received by the antenna 441 are processed by the communication device 410 using either or both communication transceiver 440 and the user device 420 to demodulate/de-spread the received signals, extract communication information, and/or determine signal energy values of the received signal. In some embodiments, the camera module 421 and/or the sensor module 422 are part of the communication transceiver 440. In some embodiments, the satellite transmission signals received by the antenna 441 are pilot signals.

Specific functions of either the user device 420 and/or the communication transceiver device 440 are provided for illustrative purposes only. Where appropriate, any component may be implemented in either the user device 420, the communication transceiver device 440, or in the combined integrated communication device 410.

In some embodiments, the user device 420 and the communication transceiver device 440 are physically connected such that the user device 420 and the communication transceiver device 440 cannot be moved independently of one another. In this case, the camera 421 may be implemented as part of either the user device 420 or the communication transceiver device 440, since its field of view aligns with the antenna direction in either or both of these implementations. In other embodiments, the user device 420 and the communication transceiver device 440 are connected by the link 430, as previously described, but are not otherwise connected. That is, in such embodiments, the communication transceiver device 440 can be moved independently of the user device 420. In this case, the camera 421 is part of the communication transceiver device 440, so that its field of view aligns with the antenna direction. In some embodiments, the communication device 410 is a single device that includes modules as described with respect to the user device 420 and the communication transceiver device 440.

Figure 5:
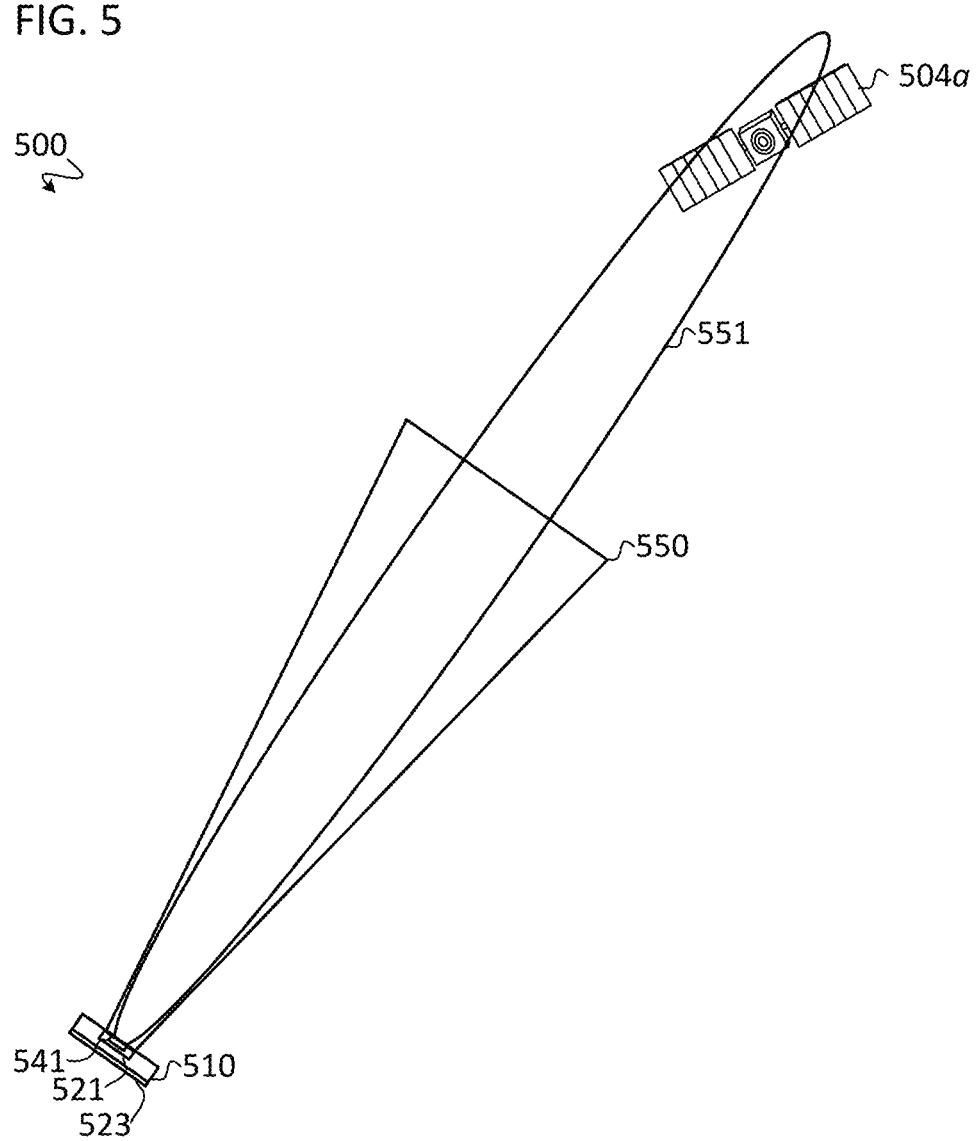
FIG. 5 is a simplified diagram of an environment incorporating the communication device shown in FIG. 4, in accordance with some embodiments.

The antenna module 441 has a main lobe that points substantially in the same direction as the center of the FOV of the camera 421 points. This is illustrated in FIG. 5. As shown, an environment 500 includes a satellite 504a that is similar to the satellite 104a and a simplified communication device 510 that is similar to the communication device 410. The communication device 510 includes a camera 521, a display screen 523, an antenna 541, as well as other sensors, processors and modules (not shown) as were discussed with reference to FIG. 4. Also shown is the camera FOV 550 of the camera 521 and the antenna main lobe ("antenna lobe") 551 of the antenna 541. The antenna lobe 551 is a simplified representation of an antenna main lobe and does not depict side-lobes of the antenna lobe 551, which may be present.

The camera 521 captures video images in the field of view 550 and the captured video images are displayed on the display screen 523. As shown, the center of the field of view 550 points in substantially the same direction as the center of the antenna lobe 551. Thus, the camera 521 "looks" in the same direction that the antenna 541 can send and receive signals to/from. Because the direction of the camera field of view 550 and the antenna lobe 551 are substantially the same, a user of the communication device 510 can observe, using the display screen 523, obstructions that may be in the path of signals exchanged between the antenna 541 and the satellite 504a. Advantageously, the user of the communication device 510, having observed such signal path obstructions, can move or otherwise adjust their position to minimize obstructions (e.g. take a few steps to the left or the right of their initial position). Additionally, a graphical overlay on the display screen 523 is used to instruct the user of the communication device 510 to point the antenna 541 substantially in the direction of the satellite 504a.

Because of inaccuracies in motion, direction, and orientation sensors of the communication device 510, an initial anticipated direction to the satellite 504a may not be the same as the actual direction towards the satellite 504a. Thus, the position of the satellite 504a icon (within the graphical overlay on the display screen 523) may not accurately reflect the actual position of the satellite 504a. As will be described, the communication device 510 uses an adaptive augmented reality display to instruct/guide the user to point the communication device 510 in a sequence of directions while measuring energy values of signals received from the satellite 504a. Thereby an updated anticipated direction to the satellite 504a is determined that is more accurate than the initial anticipated direction.

Figure 6A:
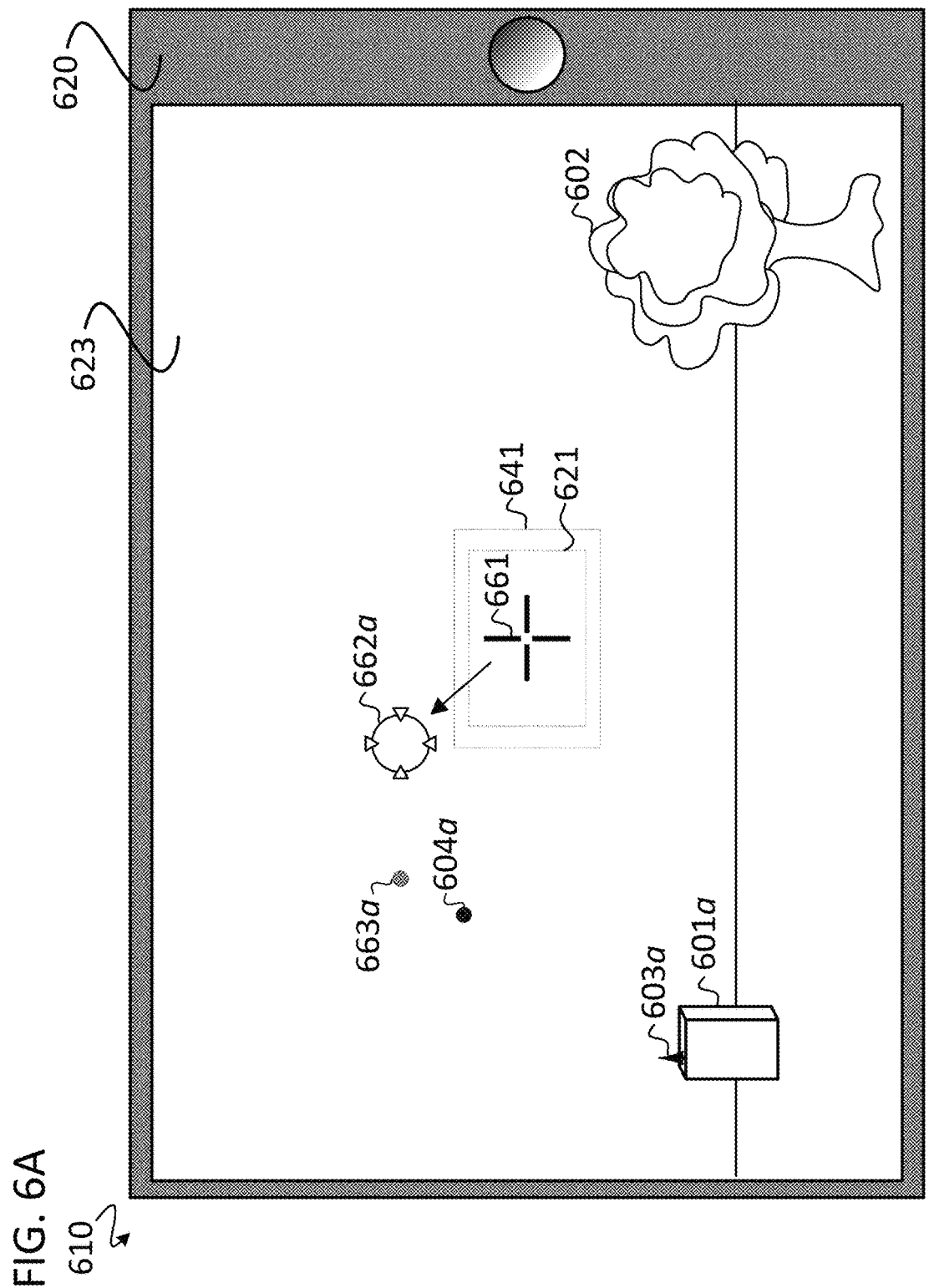

FIG. 6A shows a simplified representation of a communication device 610 that is the same or similar to the communication device 410. The communication device 610 includes a user device 620, a camera 621 (mounted on a side of the user device 620 that is opposite a display screen 623), the display screen 623, and an antenna 641 (mounted on the side of the user device 620 opposite that of the display screen 623 such that the main lobe of the antenna 641 points in substantially same direction as the center of the field of view of the camera 621 points).

An example display of the display screen 623 is shown. The display screen 623 displays video images captured by the camera 621. As shown, the captured video images include a building 601a, a tree 602, and a terrestrial transceiver 603a. The display screen 623 also displays a graphical overlay that is displayed on top of, or is blended with, the video images (e.g. an augmented reality display).

The graphical overlay includes an antenna direction indicator 661 and a guiding icon 662a. The guiding icon 662a can also be referred to as a "satellite icon". In accordance with a specific embodiment, the guiding icon 662a may include a displayed name, or any other satellite identification tag, of a specific satellite. The guiding icon 662a indicates a direction that the user of the communication device 610 should point the antenna 641. Thus, the guiding icon 662a and the antenna direction indicator 661 are used to guide/instruct the user regarding the direction that the user should move the communication device 610 to point the antenna 641 in the direction of the satellite. In other words, the displaying of the antenna direction indicator 661 and the guiding icon 662a enables the user holding the communication device 610 to move the communication device 610 to substantially align the guiding icon 662a and the antenna direction indicator 661 on the display screen so as to point the antenna 641 in a desired direction.

The antenna direction indicator 661 indicates the direction that the main lobe of the antenna 641 points. Thus, the antenna direction indicator 661 indicates the direction that communication signals can be transmitted in, and received from, with acceptable signal gain.

An anticipated direction 663a of a communication satellite and an actual direction to the communication satellite 604a are also shown. The anticipated direction 663a is an estimated direction to a communication satellite (e.g. the communication satellite 104a of FIG. 1) that is determined by the communication device 610 using sensor data (e.g. from a sensor module), satellite position information, as well as signal strength data measured using communication signals from the communication satellite. The actual direction of the satellite 604a is often not known due to positioning, directional and/or orientation inaccuracies of the communication device 610. The actual direction to the communication satellite 604a and the anticipated direction 663a are shown here for illustration purposes only and, in some embodiments, are not part of the graphical overlay. As shown, the anticipated direction 663a may be significantly offset from the actual direction to the communication satellite 604a.

An arrow pointing from the antenna direction indicator 661 to the guiding icon 662a is shown for illustration purposes and, in some embodiments, is not part of the graphical overlay. The arrow illustrates that the user of the communication device 610, upon observing the position of the guiding icon 662a on the display screen 623, will move the communication device 610 to minimize the distance on the display screen 623 between the antenna direction indicator 661 and the guiding icon 662a. By changing the position of the guiding icon 662a, the communication device 610 guides the user to point the antenna 641 in multiple directions around the anticipated direction 663a.

FIGS. 6B-6E show a simplified representation of the communication device 610 with an augmented reality display for instructing/guiding the user to point the communication device 610 in multiple directions around the anticipated direction 663a. The display screen 623 displays the video images described with reference to FIG. 6A and displays a graphical overlay that includes the antenna direction indicator 661. The anticipated direction 663a, the actual direction to the communication satellite 604a, and guiding icons shown in dashed lines are shown for illustration purposes and, in some embodiments, are not displayed on the display screen 623.

Figure 6B:
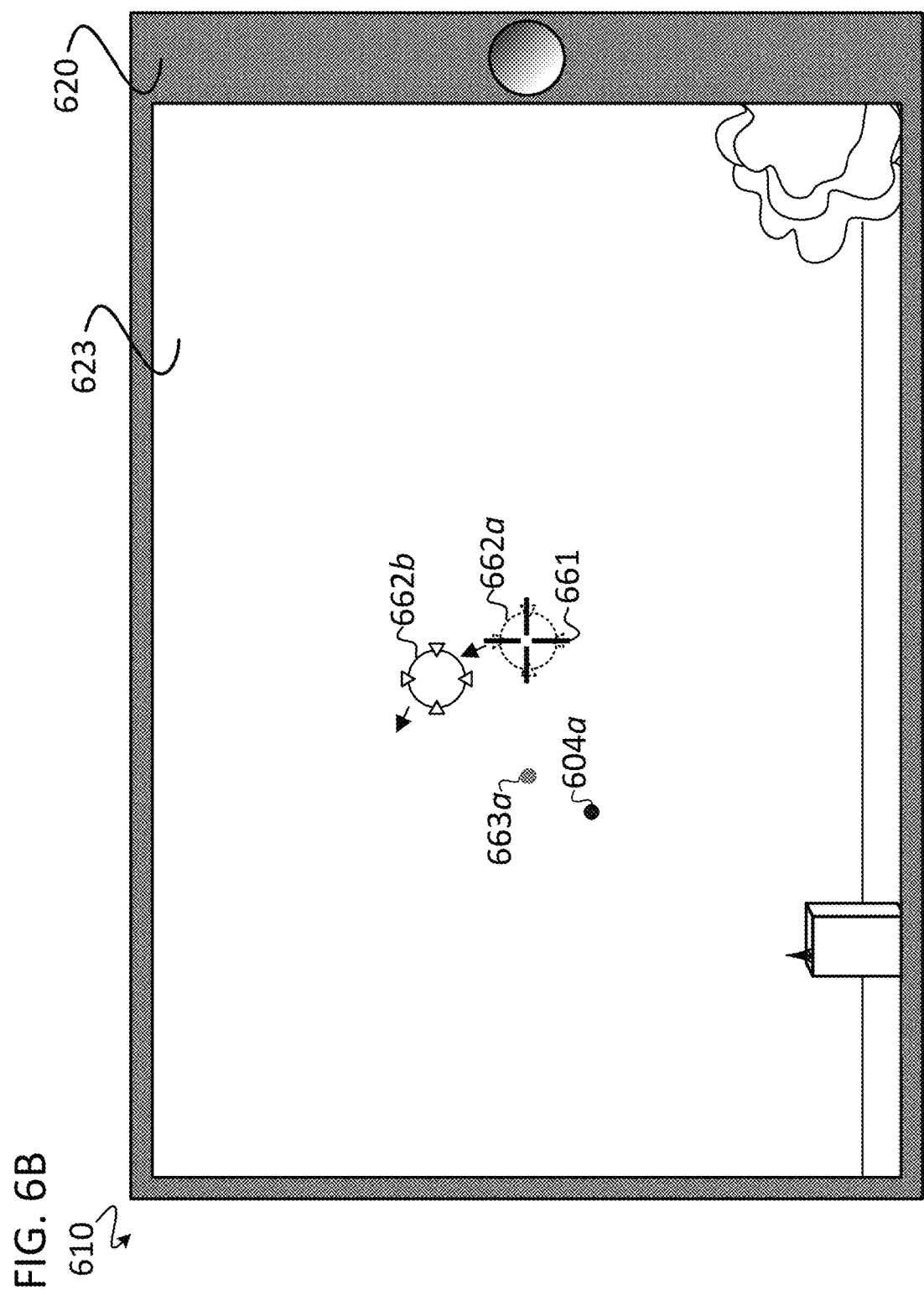
Figure 6C:
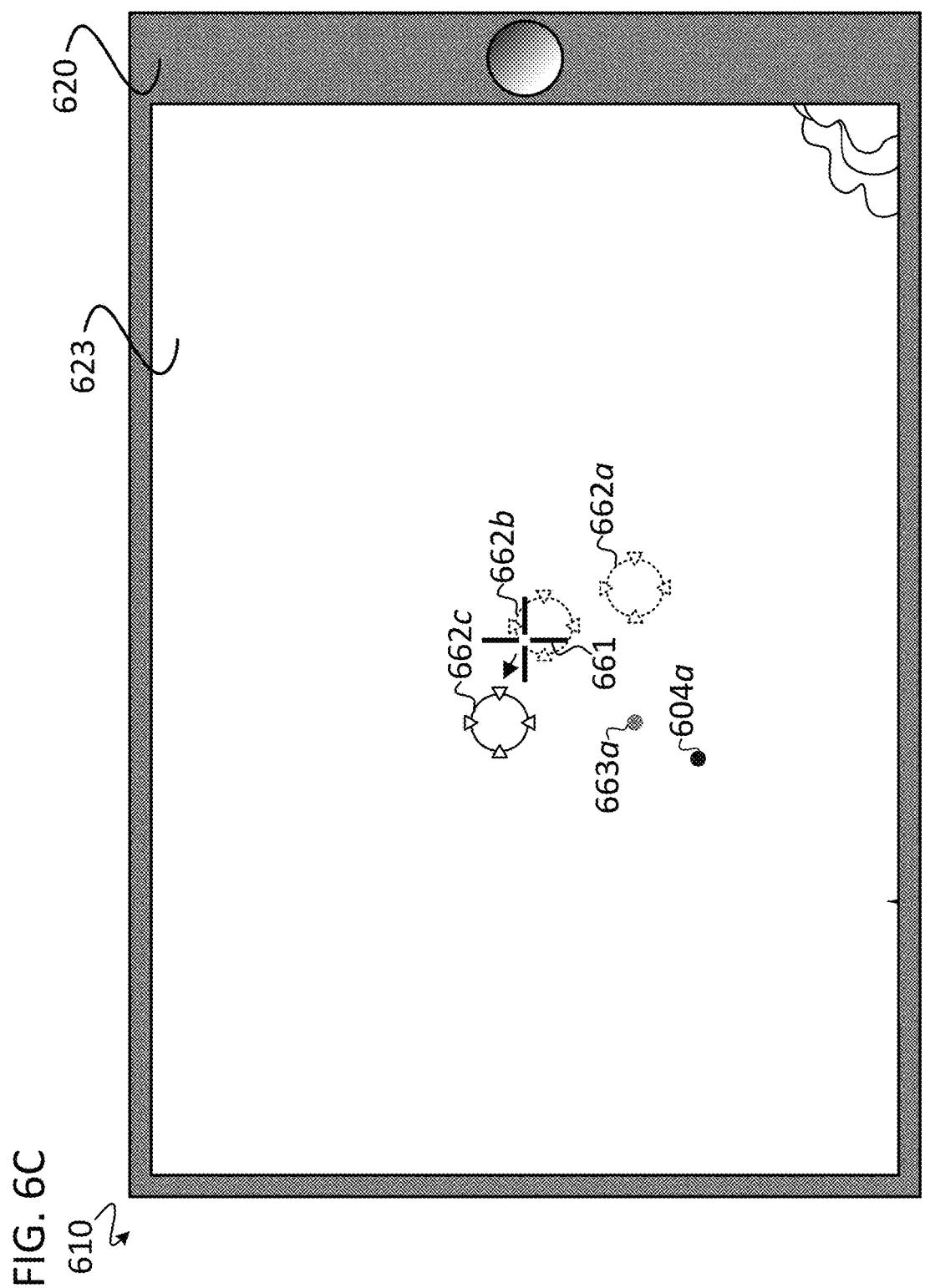

FIG. 6B includes an updated guiding icon 662b; FIG. 6C includes an updated guiding icon 662c; and FIG. 6D includes an updated guiding icon 662h and guiding icons 662d-662g. With reference to FIG. 6D, only the updated guiding icon 662h is displayed on the display screen 623 (as indicated by the use of solid lines) at the moment in time shown. The guiding icons 662a-662g indicate places on the display screen 623 where the guiding icon 662 was previously displayed (as indicated by the use of dashed lines). FIG. 6E includes an updated anticipated position 663b, an updated guiding icon 664a and guiding icons 664b-664h. Only the updated guiding icon 664a is displayed on the display screen 623 at the moment of time shown (as indicated by the use of solid lines). The guiding icons 664b-664h indicate places on the display screen 623 where the guiding icon 664 will be displayed shortly in the future (as indicated by the use of dashed lines). Details of FIGS. 6A-6E are discussed with reference to FIG. 7A and FIG. 7B. In some embodiments, steps for the process of FIG. 7A and FIG. 7B are stored in the memory 424 of the user device 420 and carried out by the processor(s) 425 of the user device 420.

Figure 7A:
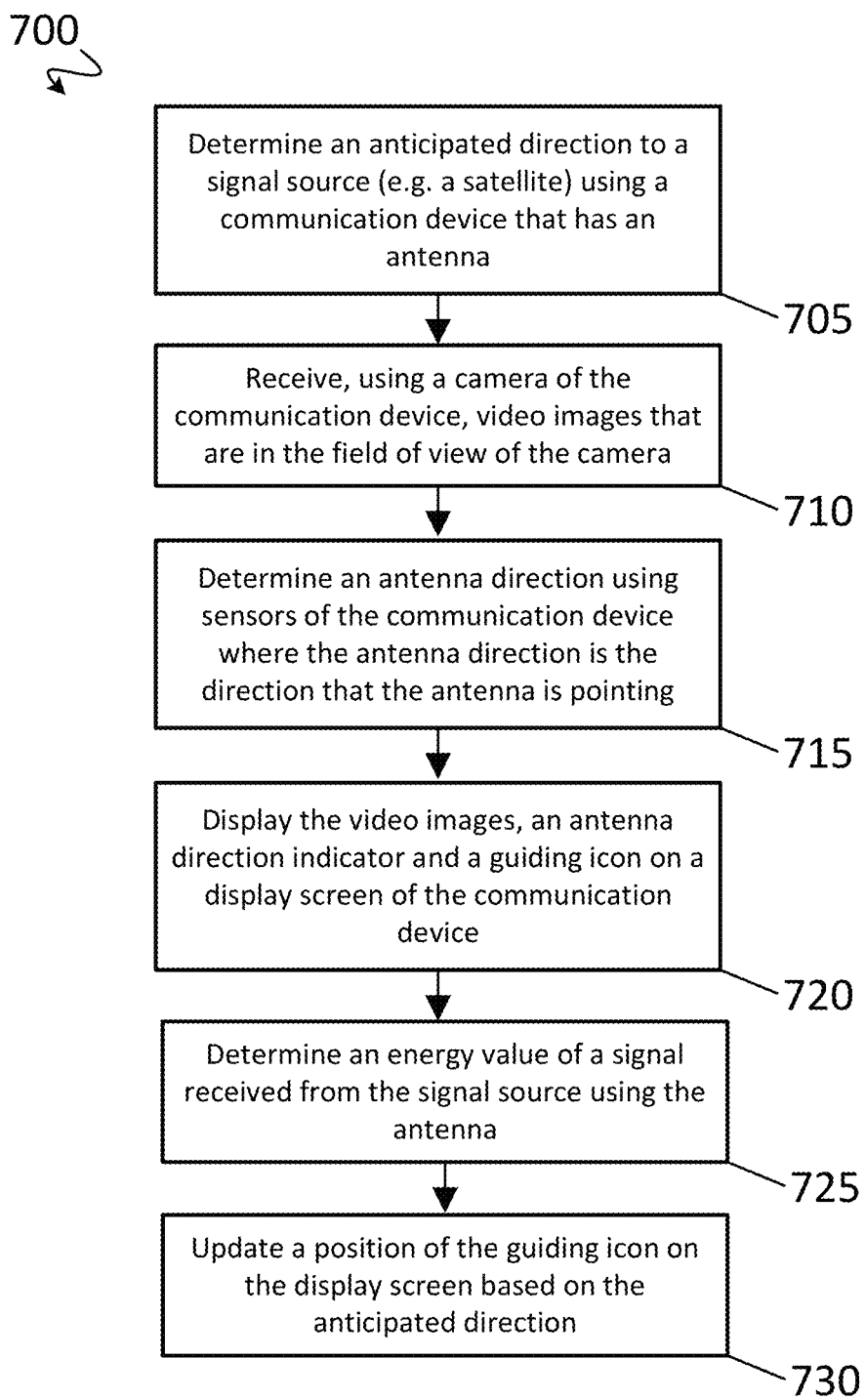
FIG. 7A-7B are simplified flowcharts of an example process performed by the communication device shown in FIG. 4, in accordance with some embodiments.
Figure 7B:
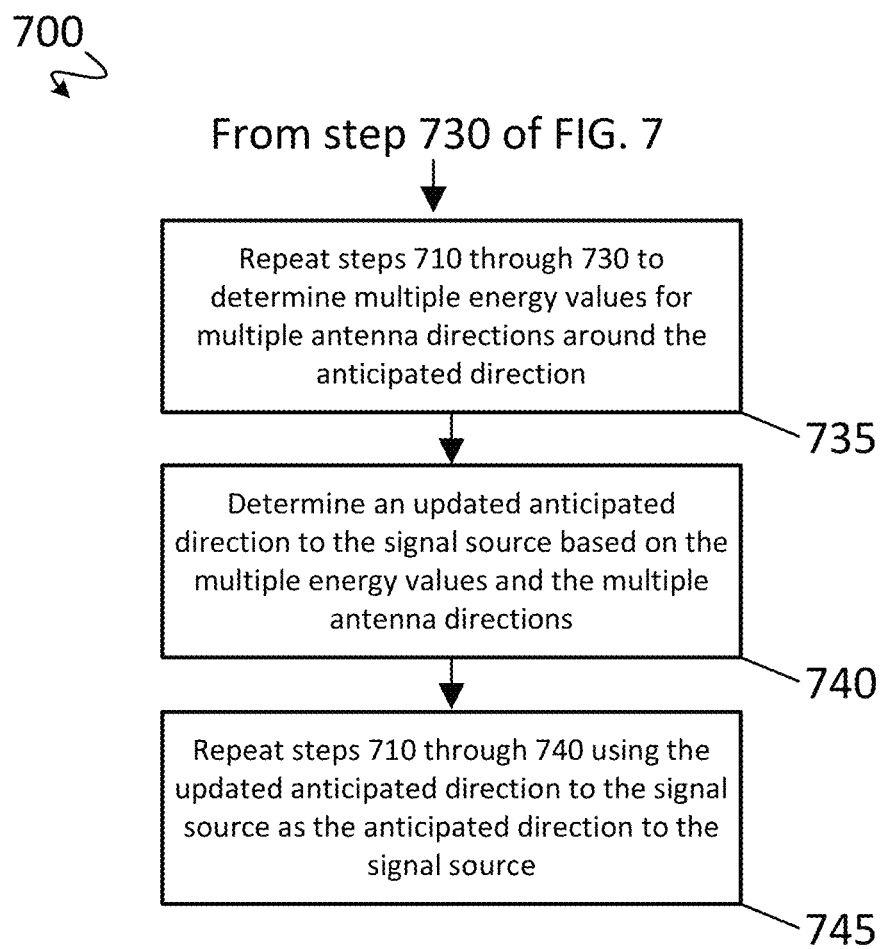

FIG. 7A is a simplified flowchart of an example process 700 for using adaptive augmented reality to point an antenna of a communication device towards a communication satellite. Reference is made to FIG. 6A through FIG. 6B. The particular steps, order of steps, and combination of steps are shown for illustrative and explanatory purposes only. Other embodiments may use different steps, orders of steps, and combinations of steps to perform similar functions.

At step 705, an anticipated direction (e.g. 663a of FIG. 6A) to a signal source (the communication satellite 604a) is determined using a communication device (610) that includes an antenna (641). In some embodiments, the anticipated direction is determined as part of a signal acquisition process of the communication device (610). In other embodiments, the anticipated direction is determined using an estimated position of the communication device and data (such as known satellite position data) that is retrieved from memory of the communication device or retrieved from a remote storage source (e.g. a server or from another satellite). At step 710, the communication device (610) receives video images, from a camera (621) of the communication device (610), that are in the FOV of the camera (621). As was discussed earlier, the FOV of the camera (621) points substantially in the same direction as the main lobe of the antenna (641). At step 715, an antenna direction of the antenna (641) is determined using sensors, such as the sensor module 422 of FIG. 4, or using similar sensors that may be implemented in the communication device (410). The antenna direction is the direction that the antenna (641) points relative to a coordinate frame.

At step 720, the video images, an antenna direction indicator (661), and a guiding icon (662a) are displayed on a display screen (623) of the communication device. The antenna direction indicator indicates the direction (e.g. the direction of the main lobe of the antenna) that the antenna pointes relative to the field of view of the camera and the guiding icon represents a direction offset from the anticipated direction. In some embodiments, the antenna direction indicator is not relative to the field of view of the camera.

At step 725, an energy value is determined for a signal received from the signal source (e.g. a communication signal that is similar to the communication signal 106) using the antenna. In some embodiments, the signal is a spread-spectrum-signal. In some embodiments, before determining an energy value, the communication device first de-spreads and demodulates the received spread spectrum signal and performs a verification step to ensure that the signal was transmitted from the intended satellite and/or is not "noise". In some embodiments, multiple initial energy values are determined at this step and the energy value is an average of the multiple initial energy values. The determined energy value(s) can be stored by the communication device using memory such as the memory 424 of FIG. 4.

At step 730, a position of the guiding icon on the display screen is updated based on the anticipated direction. This is illustrated with reference to FIG. 6B. As shown, the updated guiding icon 662b is displayed on the display screen 623 and the guiding icon 662a is no longer displayed (as shown by dashed lines). By changing the position of a guiding icon on the display screen 623 from the position of the guiding icon 662a to the position of the guiding icon 662b, the user is guided/instructed to move the communication device 610 to minimize the distance between the antenna direction indicator 661 and the guiding icon 662b (e.g. to attempt to align the antenna direction indicator 661 with the guiding icon 662b).

The process shown in FIG. 7A is continued in FIG. 7B. Reference is made to FIG. 6C through FIG. 6E.

At step 735, steps 710 through 730 of FIG. 7A are repeated to determine multiple energy values for multiple antenna directions around the anticipated direction (663a). By way of example, FIG. 6C shows the updated guiding icon 662c that is displayed as the steps of FIG. 7A are repeated a first time for the user to attempt to move the communication device 610 to align the antenna direction indicator 661 with the guiding icon 662c, and FIG. 6D shows the updated guiding icons 662d-h that are displayed as the steps of FIG. 7A are repeated for a second-sixth time, although FIG. 6D does not show the attempt to align the antenna direction indicator 661 with the guiding icons 662d-h. In this manner, the user is guided to point the antenna 641 at various locations around the anticipated direction 663a. In some embodiments, the guiding icon is updated at a high enough rate that it appears to the user that the guiding icon is simply sliding across the display screen in a roughly circular or spiral pattern, as indicated in FIG. 6D, so that the user is guided to rotate or "wobble" the antenna direction generally around the anticipate direction 663a in a similar (without having to be an exact match) rough circular or spiral pattern. Additionally, in some embodiments, the measurements of the energy values of the signals received from the satellite 504a are generally made "on-the-fly" while the user rotates the antenna direction as guided or instructed, rather than waiting for the user to properly align the antenna direction indicator exactly with the guiding icon.

At step 740, an updated anticipated direction to the signal source is determined based on the multiple energy values and the multiple antenna directions. This is illustrated in FIG. 6E, which shows the updated anticipated direction 663b.

Steps 710 through 740 are repeated at step 745 using the updated anticipated direction (663b) to the signal source as the anticipated direction to the signal source. As steps 710 through 740 are repeated, new guiding icons are displayed on the display screen 623, one guiding icon at a time. The positions of the new guiding icons are shown in FIG. 6E as the guiding icons 664a-h. As was previously discussed, only one guiding icon is displayed at a time on the display screen, though in some embodiments more than one guiding icon can be displayed. In the example shown in FIG. 6E, the guiding icon 664a is the guiding icon that is displayed. Upon observing the displayed guiding icon 664a, the user of the communication device 610 moves the communication device 610 to align, on the display screen 623, the antenna direction indicator 661 with the guiding icon 664a. As shown, the calculation performed to generate the updated anticipated direction 663b results in the updated anticipated direction 663b being closer to the actual direction to the communication satellite 604a than is the initial anticipated direction 663a. In this manner, with each repetition of steps 710-740, the communication device 610 is able to zero-in on the actual direction to the communication satellite 604a, thereby ensuring an optimized communication link with the communication satellite.

As described earlier, the communication device instructs/guides the user to point the antenna in multiple directions that are offset from the anticipated direction of the signal source, as contrasted with systems that instruct/guide a user to point an antenna directly at an anticipated direction of the signal source. By instructing the user to point the antenna in multiple directions that are offset from the anticipated direction, the described system advantageously improves the pointing accuracy of the antenna in the direction of the signal source. Additionally, by continually and rapidly updating the anticipated direction of the signal source, the antenna pointing direction is less likely to drift away from the actual direction of the satellite and thereby lose the communication channel altogether.

In accordance with some embodiments, before step 735, the process shown in FIG. 7B includes waiting until the energy value of the signal received from the signal source surpasses a threshold value, or a predetermined time elapses, before continuing to step 735. In such embodiments, for each direction that the antenna points, the user is not instructed to point the antenna in a new direction until sufficient signal energy is received from the signal source given the current antenna pointing direction.

Figure 8:
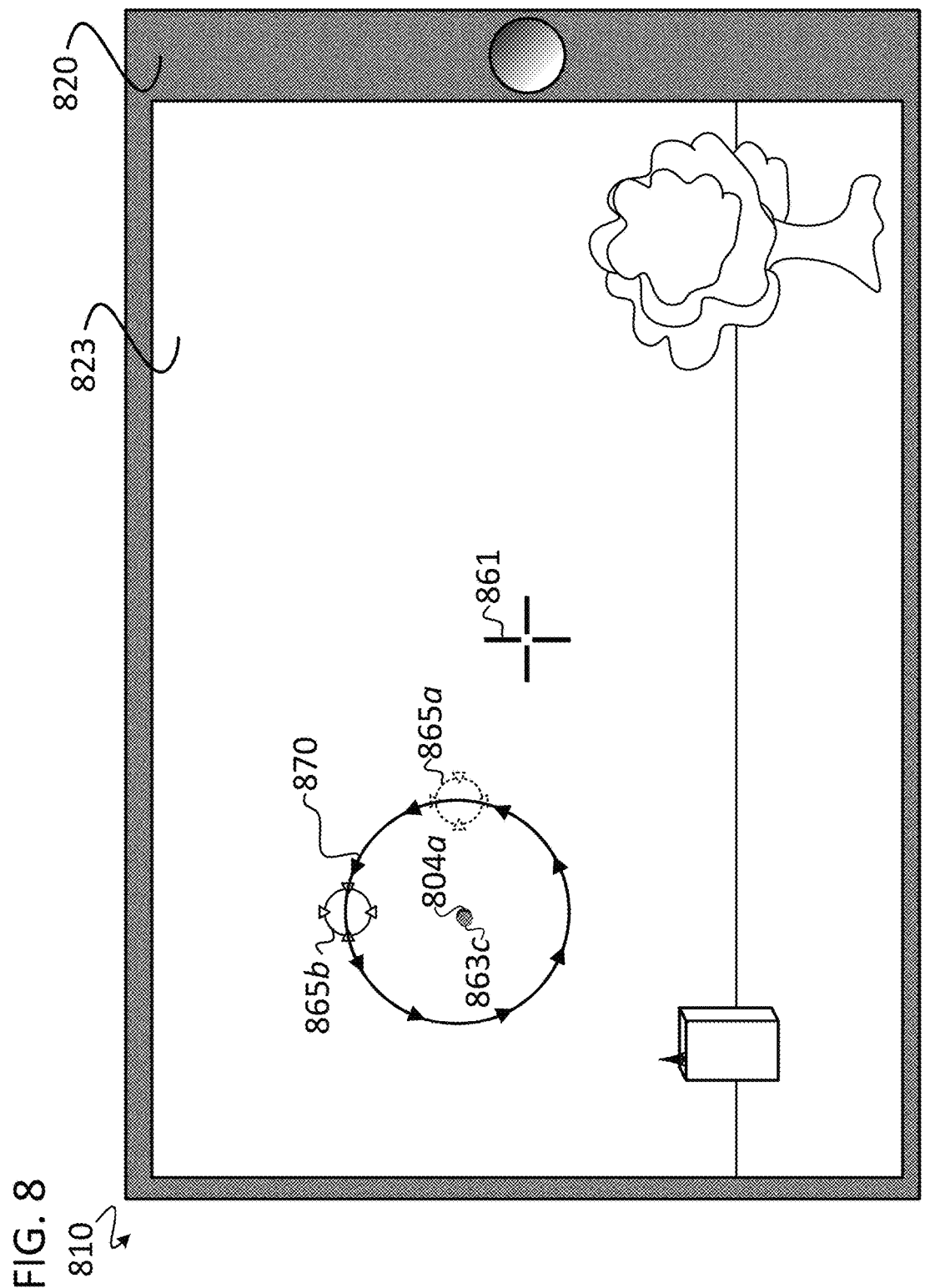
FIG. 8 is a simplified representation of the communication device shown in FIG. 4, in accordance with some embodiments.

FIG. 8, is a simplified representation of a communication device 810 that is the same or similar to the communication device 610 as described with reference to FIG. 6A. As shown, the communication device includes a user device 820 and a display screen 823. The display screen 823 displays video images similar to those described with reference to FIG. 6A and also displays a graphical overlay similar to the graphical overlay described with reference to FIG. 6A. The graphical overlay includes an antenna direction indicator 861, a guiding icon 865a and an updated guiding icon 865b. Also shown are an anticipated direction 863c, an actual direction to the communication satellite 804a, a path 870, and the guiding icon 865a (shown for illustration purposes, but not actually displayed on the display screen 823). Details of FIG. 8 are discussed with reference to FIG. 9.

Figure 9:
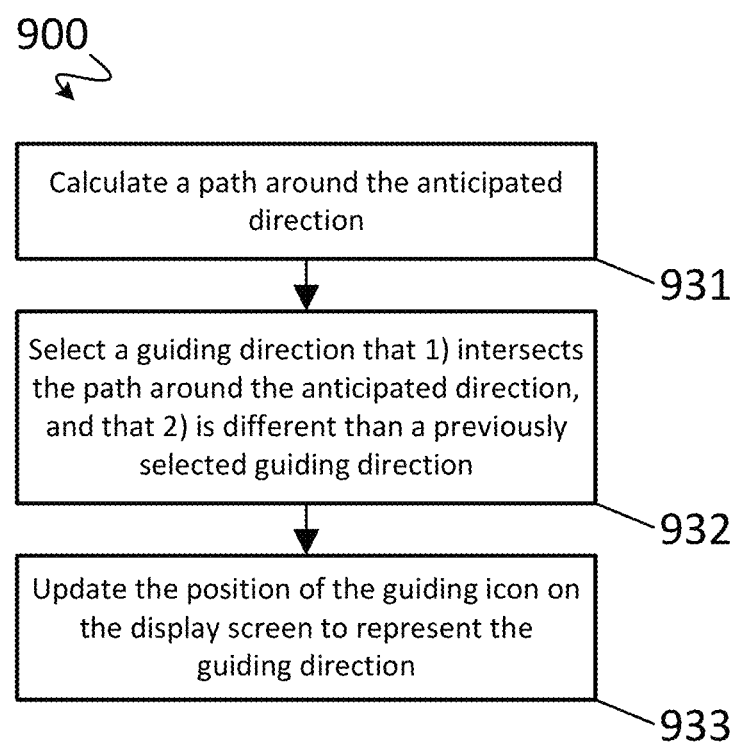
FIG. 9 is a simplified flowchart of an example process performed by the communication device shown in FIG. 4, in accordance with some embodiments.

FIG. 9 is a simplified flowchart of an example process 900 for updating a position of a guiding icon on a display screen based on an anticipated direction. Reference is made to FIG. 8. In some embodiments, the process 900 of FIG. 9 is included as part of the process of FIG. 7A, e.g., part of step 730. The particular steps, order of steps, and combination of steps are shown for illustrative and explanatory purposes only. Other embodiments may use different steps, orders of steps, and combinations of steps to perform similar functions.

At step 931, a path (shown in FIG. 8 as the path 870) around the anticipated direction 863c is calculated using the communication device 810. Though path 870 is circular, those of skill in the art will appreciate that the path around the anticipated direction 863c can be non-circular. In some embodiments, the radius of the path 870 changes depending on the state of signal acquisition. For instance, if signal acquisition of the communication is lost, the path 870 can be widened until the communication signal is reacquired. On the other hand, the path 870 can be made smaller when there is greater certainty that the anticipated direction 863c is close to the actual direction to the communication satellite 804a. Additionally, in some embodiments, the radius of the path 870 can be determined based on the magnitude of a previous direction correction delta used when updating the anticipated direction. In some embodiments, the path is a spiral or conical path. In other embodiments, the path is a Lissajous curve. In still other embodiments, the path follows a random or pseudorandom pattern. In any of the previously mentioned embodiments, the radius of the path can be adjusted between repetitions of the process steps shown in FIG. 7A and FIG. 7B. In accordance with yet another embodiment, the actual trajectory that the communication device follows is affected by possible shaking of the hand of the user who holds/moves the communication device.

At step 932, the communication device (e.g. 810 of FIG. 8) selects a guiding direction that 1) intersects the path (870) around the anticipated direction (863c), and 2) is different than a previously selected guiding direction. Then, at step 933, the communication device updates the position of the guiding icon (from the guiding icon 865a to the guiding icon 865b) on the display screen to represent the guiding direction.

As the antenna of a communication device is made to point in multiple directions, the communication device receives communication signals from a communication satellite. The communication device uses the received communication signals to determine energy values associated with the multiple positions.

Figure 10:
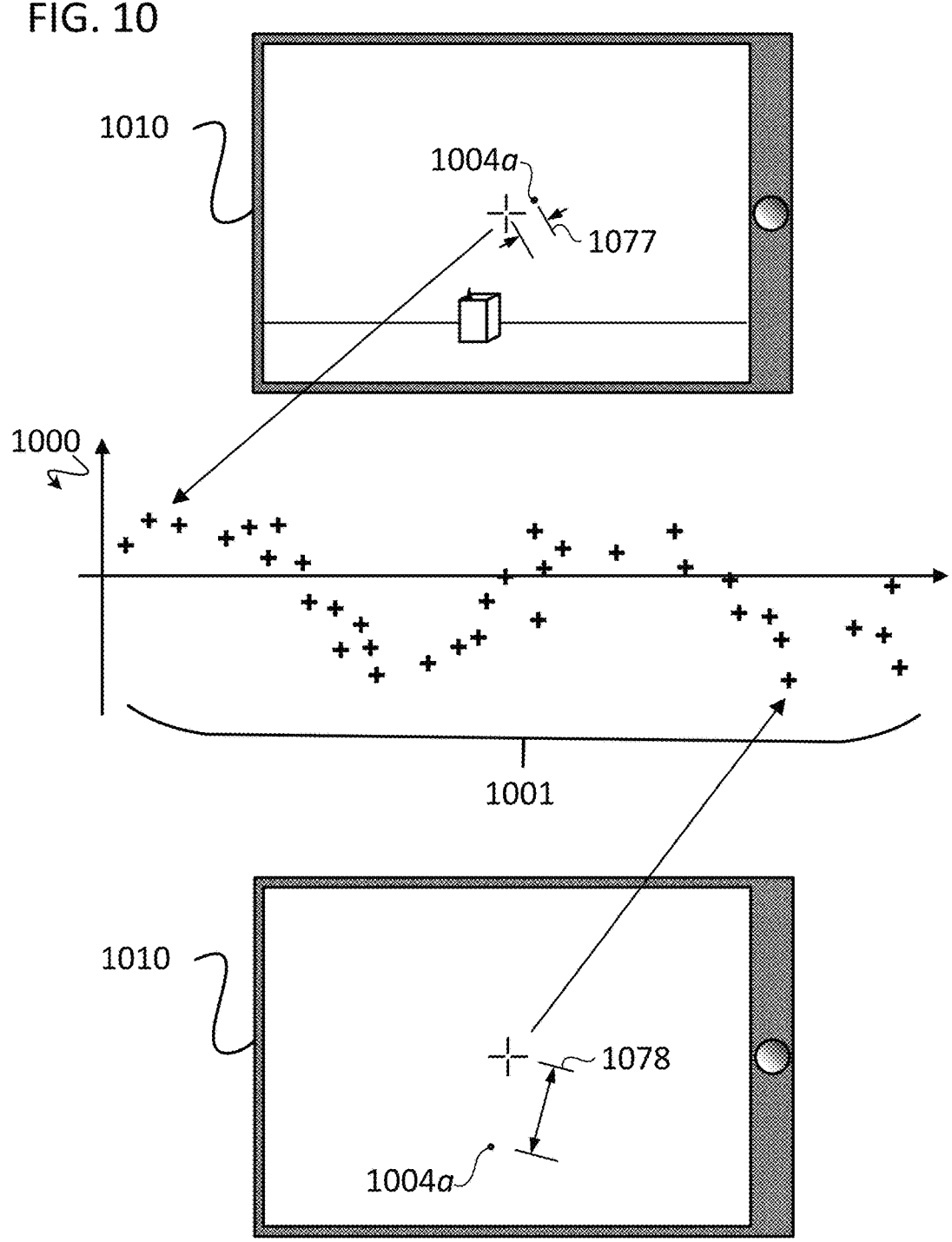
FIG. 10 is a simplified representation of the communication device shown in FIG. 4 and a simplified scatter plot of multiple energy values, in accordance with some embodiments.

Calculating a Minimum Energy Value and a Maximum Energy Value Based on Multiple Energy Values FIG. 10 shows a simplified representation of a communication device 1010 and a simplified scatter plot 1000 of multiple energy values 1001 determined as the communication device 1010 is pointed in multiple directions. The communication device 1010 is similar to the communication device 610 of FIG. 6A. As shown, energy values of the multiple energy values 1001 that are determined when the communication device 1010 points substantially closer to an actual direction of a communication satellite 1004a (as shown by a dimensional element 1077) are higher than energy values determined when the communication device 1010 points further away from the actual direction of the communication satellite 1004a (as shown by another dimensional element 1078).

Figure 11:
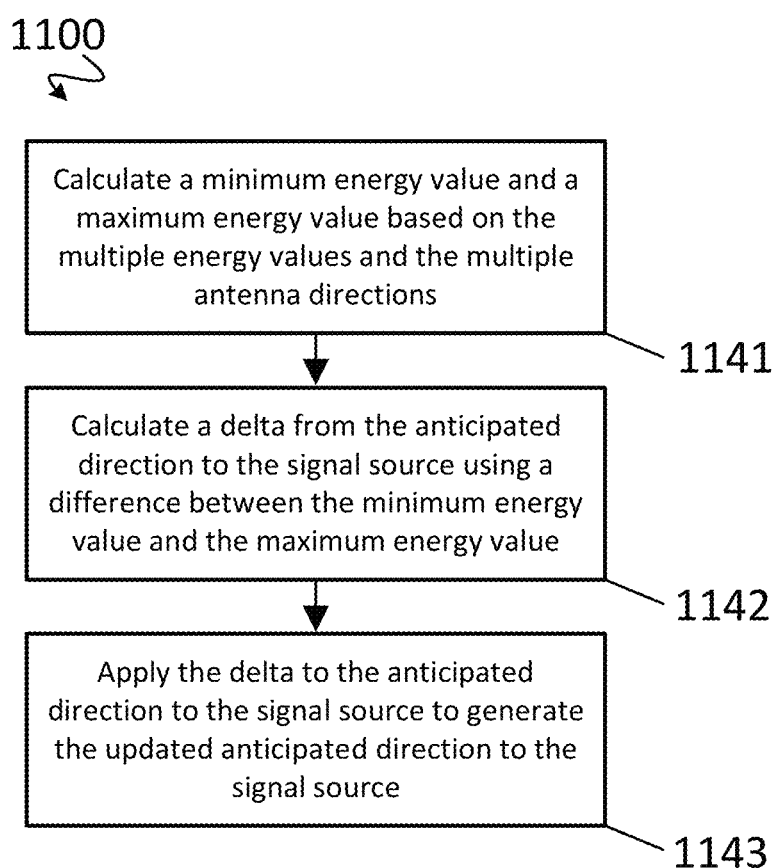
FIG. 11 is a simplified example process performed by the communication device shown in FIG. 4, in accordance with some embodiments.

After the multiple energy values 1001 have been determined by pointing the communication device in multiple directions, the multiple energy values 1001 and multiple directions are used to determine an updated anticipated direction to the signal source (e.g. the communication satellite). FIG. 11 is a simplified example process 1100 for determining the updated anticipated direction to a signal source based on multiple energy values and multiple antenna directions. In some embodiments, the process 1100 of FIG. 11 is part of step 740 of FIG. 7B. The particular steps, order of steps, and combination of steps are shown for illustrative and explanatory purposes only. Other embodiments may use different steps, orders of steps, and combinations of steps to perform similar functions.

As shown, at step 1141, the communication device calculates a minimum energy value and a maximum energy value based on the multiple energy values and the multiple antenna directions. At step 1142, the communication device calculates a direction correction delta (e.g. a correction factor) from the anticipated direction to the signal source using a difference between the minimum energy value and the maximum energy value. In some embodiments, the direction correction delta is proportional to a difference between the minimum energy value and the maximum energy value. Then, at step 1143, the communication device applies the direction correction delta to the anticipated direction to the signal source to generate the updated anticipated direction to the signal source.

In some embodiments, an equation/formula for calculating the direction correction delta ($\Delta$) at step 1142 is expressed as:

$$\Delta = \beta \times (E_2 - E_1) \times (T_2 - T_1) \qquad \text{(Equation 1)}$$

where beta (β) is a pre-determined coefficient, $E_1$ is the minimum determined energy value, $E_2$ is the maximum determined energy value, $T_1$ is an antenna direction corresponding to the minimum determined energy value, and $T_2$ is an antenna direction corresponding to the maximum determined energy value. In some embodiments, beta is used as a "gain/attenuation" parameter used to ensure that updates made to the anticipated direction are not unacceptably small and are not unacceptably large. For example, beta may be a value greater than zero and less than one. In other embodiments, beta may be a value that is less than zero.

In some embodiments, an equation/formula for applying the direction correction delta to the anticipated direction at step 1182 is expressed as:

$$S_2 = S_1 + \Delta \quad \text{(Equation 2)},$$

where the direction correction delta (Δ) is from equation 1, $S_1$ is the anticipated direction to the signal source, and $S_2$ is the updated anticipated direction to the signal source.

The communication device (e.g. the communication device 410 of FIG. 4) is held by a user instead of being adjustably mounted on a fixed base, and the direction that the communication device points is controlled by movements made by the user. Thus, the direction that the communication device points is subject to involuntary movement by the user (e.g. muscle tremors, instability, inaccurate pointing, etc.). However, such involuntary movement may be similar to the general rotation or "wobble" of the antenna direction described above, and as such is not necessarily a problem.

Due to non-idealities or design trade-offs, the antenna lobe may have a shape that diverges from an ideal shape. For example, in some embodiments, the main lobe of an antenna (e.g. the antenna 441 of FIG. 4) of the communication device may be substantially flat in a region (e.g. the antenna gain falls off differently on the top of the lobe versus on the sides of the lobe). Additionally, due to pointing inaccuracies made by the user of the communication device, there may be sections along the path (e.g. path 870 of FIG. 8) around the anticipated location where no data has been collected. Thus, in some embodiments, a curve fitting algorithm is used to interpolate, extrapolate and/or filter the data to identify the minimum energy value and the maximum energy value of the collected energy values.

Figure 12A:
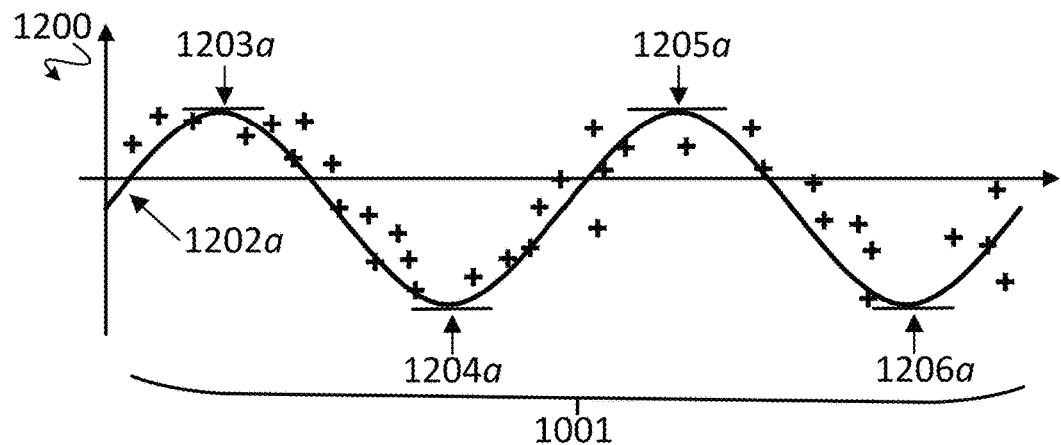
FIG. 12A-C are simplified plots of lines fitted to multiple energy values, in accordance with some embodiments.

FIG. 12A is a simplified plot 1200 of a sinusoid 1202a fitted to the multiple energy values 1001 that were determined as a communication device was pointed in multiple directions. As shown, the sinusoid 1202a has local maximums at point 1203a and at point 1205a. The sinusoid 1202a has local minimums at point 1204a and at point 1206a. Details of FIG. 12A are discussed with reference to FIG. 13.

Figure 12B:
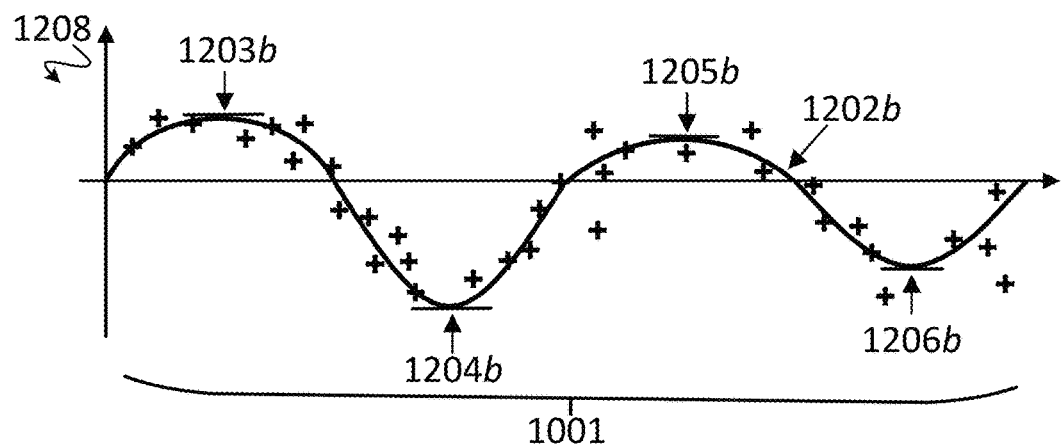

FIG. 12B shows a simplified plot 1208 of a distorted (e.g. non-ideal) sinusoid 1202b fitted to the multiple energy values 1001 that were determined as a communication device was pointed in multiple directions. As shown, the distorted sinusoid 1202b has local maximums at the point 1203b and at point 1205b. The distorted sinusoid 1202b has local minimums at the point 1204b and at point 1206b. Details of FIG. 12B are discussed with reference to FIG. 13.

Figure 12C:
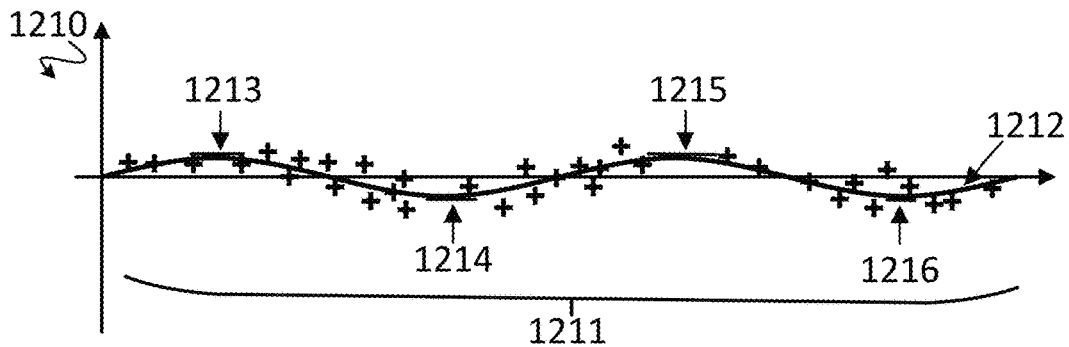

FIG. 12C shows a simplified plot 1210 of a sinusoid 1212 fitted to multiple energy values 1211 that were determined as a communication device (that is similar to the communication device 410 of FIG. 4) was pointed in multiple directions. As shown, the sinusoid 1212 has local maximums at point 1213 and at point 1215. The sinusoid 1212 has local minimums at point 1214 and at point 1216. Details of FIG. 12C are discussed with reference to FIG. 13.

FIG. 13 is a simplified flowchart of an example process for calculating a minimum energy value and a maximum energy value based on multiple energy values and multiple antenna directions. In some embodiments, the process of FIG. 13 includes a curve fitting algorithm. In such embodiments, the calculated minimum energy value and the calculated maximum value are determined using a line that has been fitted to the multiple energy values rather than using the multiple energy values directly. In some embodiments, the curve fitting algorithm is included as part of step 1141 of FIG. 11. In some embodiments, the steps of FIG. 13 are stored in the memory 424 of the user device 420 and carried out by the processor(s) 425 of the user device 420. FIG. 13 is discussed with reference to FIGS. 12A-C. The particular steps, order of steps, and combination of steps are shown for illustrative and explanatory purposes only. Other embodiments may use different steps, orders of steps, and combinations of steps to perform similar functions.

At step 1341a, the communication device fits a sinusoid to the multiple energy values. In some embodiments, the sinusoid is a non-distorted sinusoid. This is illustrated as part of FIG. 12A, which shows the sinusoid 1202a that has been fitted to the multiple energy values 1001.

Then, at step 1341b, the communication device calculates an initial maximum energy value and an initial minimum energy value using the sinusoid. With reference to FIG. 12A, the points 1203a, 1204a, 1205a and 1206a are calculated using the sinusoid 1202a. As shown, the local maximums of the sinusoid 1202a are equal in amplitude (the point 1203a and the point 1205a). Likewise, the local minimums of the sinusoid 1202a are equal in amplitude (the point 1204a and the point 1206a). Thus, the initial maximum energy value can be calculated to be the amplitude of either point.

At step 1341c, the communication device calculates a distorted sinusoid using the initial maximum energy value, the initial minimum energy value and one or more parameters of the antenna (e.g. a characterization of lobe shape). Then, at step 1341d, the communication device fits the distorted sinusoid to the plurality of energy values. This is illustrated as part of FIG. 12B, which shows the distorted sinusoid 1202b which has been fitted to the multiple energy values 1001. As was previously discussed, in some embodiments, the main lobe of the antenna (e.g. the main lobe 551 of the antenna 541 of FIG. 5) is non-linear. Because of such non-linearity, in some embodiments a distorted sinusoid (e.g. the distorted sinusoid 1202b) provides a more accurate fit to the energy values than an ideal sinusoid (e.g. the sinusoid 1202a). Curve fitting with either the sinusoid 1202a and/or the distorted sinusoid 1202b can be repeated either a predetermined number of times or until the cumulative error of the curve fitting is below a predetermined value.

At step 1341e, the communication device calculates the maximum determined energy value and the minimum determined energy value using the distorted sinusoid. With reference again to FIG. 12B, the points 1203b, 1204b, 1205b and 1206b are calculated using the distorted sinusoid 1202b. The maximum determined energy value in this example is calculated to be the energy value corresponding to the point 1203b. The minimum determined energy value in this example is calculated to be the energy value corresponding to the point 1204b.

With reference to FIG. 12C, as an anticipated direction to a signal source becomes substantially the same as an actual direction to the signal source (e.g. after one or more iterations of the steps described with reference to FIG. 7A and FIG. 7B), the sinusoid 1212 that is fitted to the multiple energy values 1211 will have a diminished amplitude. Thus, the maximum determined energy level and the minimum determined energy level will result in a smaller direction correction delta when used in equation 1.

Additional Aspects

Figure 14:
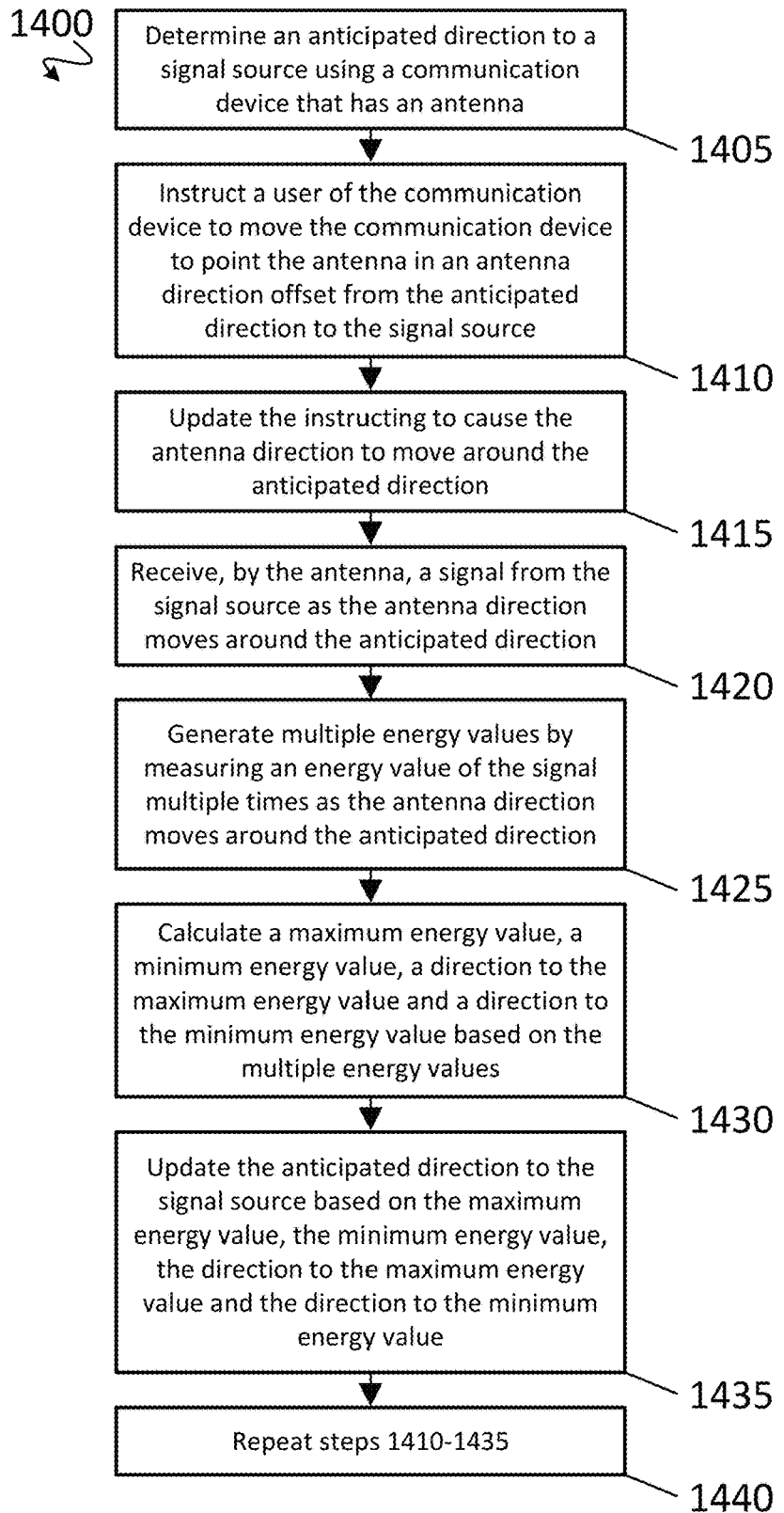
FIG. 14 is a simplified flowchart of an example process performed by the communication device shown in FIG. 4, in accordance with some embodiments.

FIG. 14 is a simplified flowchart of an example adaptive process 1400 for pointing an antenna in the direction of a signal source, in accordance with some embodiments. In some embodiments, the steps of FIG. 14 are stored in the memory 424 of the user device 420 and carried out by the processor(s) 425 of the user device 420. The particular steps, order of steps, and combination of steps are shown for illustrative and explanatory purposes only. Other embodiments may use different steps, orders of steps, and combinations of steps to perform similar functions.

At step 1405, the communication device (e.g., 410) determines an anticipated direction to a signal source (e.g., 104a) using a communication device that has an antenna (e.g., 141). At step 1410, the communication device instructs a user of the communication device to move the communication device to point the antenna in an antenna direction offset from the anticipated direction to the signal source (the antenna direction is the direction that the antenna is pointing). At step 1415, the communication device updates the instructing to cause the antenna direction to be moved around the anticipated direction, as described above. That is, having observed the instructing, and in response to the instructing, the user moves the communication device 410 to point the antenna in a new direction. At step 1420, the communication device receives, by the antenna, a signal from the signal source as the antenna direction moves (e.g. is moved by the user 105 of FIG. 1) around the anticipated direction. At step 1425, the communication device generates multiple received energy values by measuring, by the communication device, a received energy value of the signal multiple times as the antenna direction moves (e.g. is moved by the user 105) around the anticipated direction. At step 1430, the communication device calculates a maximum energy value, a minimum energy value, a direction to the maximum energy value and a direction to the minimum energy value based on the multiple energy values, as described above. The calculation of the minimum and maximum received power values may include using a curve fitting algorithm as previously described. At step 1435, the communication device updates the anticipated direction to the signal source based on the maximum energy value, the minimum energy value, the direction to the maximum energy value and the direction to the minimum energy value. Then, at step 1440, steps 1410-1435 are repeated.

In some embodiments, the instructing of step 1410 includes one, or a combination of: audio instructions, non-video instructions, haptic feedback, or other methods of instructing as are known in the art. That is, although embodiments have been described as including a video image as part of the augmented reality display, those skilled in the art will appreciate that described processes are operable without utilizing a camera.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   (a) determining, by a communication device having an antenna, an anticipated direction to a signal source;
   (b) receiving, by the communication device using a camera of the communication device, video images in a field of view of the camera;
   (c) determining, by the communication device using sensors of the communication device, an antenna direction, wherein the antenna direction is the direction that the antenna is pointing;
   (d) displaying, by the communication device using a display screen of the communication device, (1) the video images, (2) an antenna direction indicator, and (3) a guiding icon, wherein the antenna direction indicator indicates the antenna direction relative to the field of view of the camera, and the guiding icon represents a direction offset from the anticipated direction;
   (e) determining, by the communication device using the antenna, an energy value of a signal received from the signal source; and
   (f) updating, by the communication device, a position of the guiding icon on the display screen based on the anticipated direction by:
      calculating, by the communication device, a path around the anticipated direction;
      selecting, by the communication device, a guiding direction, wherein the guiding direction intersects the path around the anticipated direction, and the guiding direction is different than a previously selected guiding direction; and
      updating, by the communication device, the position of the guiding icon on the display screen to represent the guiding direction.

2. The method of claim 1, further comprising:
   (g) repeating (b) through (f) to determine a plurality of energy values for a plurality of antenna directions around the anticipated direction;
   (h) determining, by the communication device, an updated anticipated direction to the signal source based on the plurality of energy values and the plurality of antenna directions; and
   (i) repeating (b) through (h) using the updated anticipated direction to the signal source as the anticipated direction to the signal source.

3. The method of claim 2, wherein:
   the displaying of the antenna direction indicator and the guiding icon enables a user holding the communication device to move the communication device to substantially align the guiding icon and the antenna direction indicator on the display screen and to point the antenna in a desired direction.

4. The method of claim 1, wherein:
the determining at (e) includes waiting until either: (i) the energy value of the signal received from the signal source surpasses a threshold value, or (ii) a predetermined time elapses.

5. A method comprising:
(a) determining, by a communication device having an antenna, an anticipated direction to a signal source;
(b) receiving, by the communication device using a camera of the communication device, video images in a field of view of the camera;
(c) determining, by the communication device using sensors of the communication device, an antenna direction, wherein the antenna direction is the direction that the antenna is pointing;
(d) displaying, by the communication device using a display screen of the communication device, (1) the video images, (2) an antenna direction indicator, and (3) a guiding icon, wherein the antenna direction indicator indicates the antenna direction relative to the field of view of the camera, and the guiding icon represents a direction offset from the anticipated direction;
(e) determining, by the communication device using the antenna, an energy value of a signal received from the signal source; and
(f) updating, by the communication device, a position of the guiding icon on the display screen based on the anticipated direction;
(g) repeating (b) through (f) to determine a plurality of energy values for a plurality of antenna directions around the anticipated direction;
(h) determining, by the communication device, an updated anticipated direction to the signal source based on the plurality of energy values and the plurality of antenna directions by:
calculating a minimum energy value and a maximum energy value based on the plurality of energy values and the plurality of antenna directions;
calculating a direction correction delta from the anticipated direction to the signal source, wherein the direction correction delta is proportional to a difference between the minimum energy value and the maximum energy value; and
calculating the updated anticipated direction to the signal source by applying the direction correction delta to the anticipated direction to the signal source; and
(i) repeating (b) through (h) using the updated anticipated direction to the signal source as the anticipated direction to the signal source.

6. The method of claim 5, wherein:
the maximum energy value and the minimum energy value are calculated using a curve fitting algorithm and the plurality of energy values.

7. The method of claim 6, wherein:
the curve fitting algorithm calculates the maximum energy value and the minimum energy value by fitting a sinusoid to the plurality of energy values.

8. The method of claim 6, wherein:
the curve fitting algorithm further comprises:
fitting a sinusoid to the plurality of energy values;
calculating, using the sinusoid, an initial maximum energy value and an initial minimum energy value;
determining a distorted sinusoid using the initial maximum energy value, the initial minimum energy value, and one or more parameters of the antenna;
fitting the distorted sinusoid to the plurality of energy values; and
calculating the maximum energy value and the minimum energy value using the distorted sinusoid.

9. The method of claim 5, wherein:
the determining of an updated anticipated direction to the signal source is based on a formula:

$$S_2 = S_1 + \text{Beta} \times (E_2 - E_1) \times (T_2 - T_1);$$

where:
$S_1$ is the anticipated direction to the signal source;
$S_2$ is the updated anticipated direction to the signal source;
Beta is a pre-determined coefficient;
$E_1$ is the minimum determined energy value;
$E_2$ is the maximum determined energy value;
$T_1$ is an antenna direction corresponding to the minimum determined energy value; and
$T_2$ is an antenna direction corresponding to the maximum determined energy value.

10. The method of claim 1, wherein:
the signal source is a satellite in orbit around Earth; and
the signal is a satellite transmission signal.

11. A communication device comprising:
an antenna that receives a signal from a signal source;
a receiver module coupled to the antenna to receive and process the signal;
a sensor module to determine motion and position information of the communication device;
a display screen to display a plurality of icons;
a memory that stores instructions; and
a processor coupled to the receiver module, the sensor module, the display screen, and the memory and configured to execute the instructions;
wherein the instructions, when executed by the processor, cause the processor to execute a method comprising:
(a) determining an anticipated direction to the signal source;
(b) determining, using the sensor module, an antenna direction, wherein the antenna direction is the direction that the antenna is pointing;
(c) displaying, on the display screen, the plurality of icons, the plurality of icons comprising an antenna direction indicator and a guiding icon, the antenna direction indicator indicating the antenna direction, and the guiding icon representing a direction offset from the anticipated direction;
(d) determining, using the receiver module, an energy value of the signal received from the signal source;
(e) updating a position of the guiding icon on the display screen based on the anticipated direction by:
calculating a path around the anticipated direction;
selecting a guiding direction, wherein the guiding direction intersects the path, and the guiding direction is different than a previously selected guiding direction; and
updating the position of the guiding icon on the display screen to represent the guiding direction;
(f) repeating (b) through (e) to generate a plurality of energy values for a plurality of antenna directions around the anticipated direction;
(g) determining an updated anticipated direction to the signal source based on the plurality of energy values and the plurality of antenna directions; and
(h) repeating (b) through (g), using the updated anticipated direction to the signal source as the anticipated direction to the signal source.

12. The communication device of claim 11, further comprising:
a camera to receive video images in a field of view of the camera, the camera being coupled to the display screen to display an augmented reality display comprising the video images and the plurality of icons;
wherein:
(c) further comprises displaying on the display screen the augmented reality display, the augmented reality display comprising: (1) the video images, (2) the antenna direction indicator, and (3) the guiding icon; and
the antenna direction indicator indicates the antenna direction relative to the field of view of the camera.

13. The communication device of claim 11, wherein:
the displaying of the antenna direction indicator and the guiding icon enables a user holding the communication device to move the communication device to substantially align the guiding icon and the antenna direction indicator on the display screen and to point the antenna in a desired direction.

14. The communication device of claim 11, wherein:
the signal source is a satellite in orbit around Earth; and
the signal is a satellite transmission signal.

15. A communication device comprising:
an antenna that receives a signal from a signal source;
a receiver module coupled to the antenna to receive and process the signal;
a sensor module to determine motion and position information of the communication device:
a display screen to display a plurality of icons;
a memory that stores instructions; and
a processor coupled to the receiver module, the sensor module, the display screen, and the memory and configured to execute the instructions;
wherein the instructions, when executed by the processor, cause the processor to execute a method comprising:
(a) determining an anticipated direction to the signal source;
(b) determining, using the sensor module, an antenna direction, wherein the antenna direction is the direction that the antenna is pointing;
(c) displaying, on the display screen, the plurality of icons, the plurality of icons comprising an antenna direction indicator and a guiding icon, the antenna direction indicator indicating the antenna direction, and the guiding icon representing a direction offset from the anticipated direction;
(d) determining, using the receiver module, an energy value of the signal received from the signal source;
(e) updating a position of the guiding icon on the display screen based on the anticipated direction;
(f) repeating (b) through (e) to generate a plurality of energy values for a plurality of antenna directions around the anticipated direction;
(g) determining an updated anticipated direction to the signal source based on the plurality of energy values and the plurality of antenna directions; and
(h) repeating (b) through (g), using the updated anticipated direction to the signal source as the anticipated direction to the signal source;

wherein:
the determining of the updated anticipated direction to the signal source calculates a direction correction delta from the anticipated direction to the signal source;
the direction correction delta is applied to the anticipated direction to generate the updated anticipated direction;
the direction correction delta is proportional to a difference between a minimum energy value and a maximum energy value; and
the maximum energy value and the minimum energy value are calculated using a curve fitting algorithm and the plurality of energy values.

16. A method comprising:
(a) determining, by a communication device having an antenna, an anticipated direction to a signal source;
(b) instructing, by the communication device, a user of the communication device to move the communication device to point the antenna in an antenna direction offset from the anticipated direction to the signal source, wherein the antenna direction is the direction that the antenna is pointing;
(c) updating, by the communication device, the instructing to cause the antenna direction to be moved around the anticipated direction;
(d) receiving, by the antenna, a signal from the signal source as the antenna direction is moved around the anticipated direction;
(e) generating a plurality of energy values by measuring, by the communication device, an energy value of the signal a plurality of times as the antenna direction is moved around the anticipated direction;
(f) calculating, by the communication device, a maximum energy value, a minimum energy value, a direction to the maximum energy value and a direction to the minimum energy value based on the plurality of energy values;
(g) updating, by the communication device, the anticipated direction to the signal source based on the maximum energy value, the minimum energy value, the direction to the maximum energy value and the direction to the minimum energy value; and
(h) repeating (b)-(g).

17. The method of claim 16, wherein:
the maximum energy value and the minimum energy value are calculated using a curve fitting algorithm and the plurality of energy values.

18. The method of claim 17, wherein:
the curve fitting algorithm further comprises:
fitting a sinusoid to the plurality of energy values;
calculating, using the sinusoid, an initial maximum energy value and an initial minimum energy value;
determining a distorted sinusoid using the initial maximum energy value, the initial minimum energy value, and one or more parameters of the antenna;
fitting the distorted sinusoid to the plurality of energy values; and
calculating the maximum determined energy value and the minimum determined energy value using the distorted sinusoid.

* * * * *